Jan. 28, 1941.   R. L. MULLER   2,229,762
CALCULATING MACHINE
Filed Nov. 23, 1935   10 Sheets-Sheet 3

INVENTOR
Robert L. Muller
BY Davis, Macauley, May, Lindsey, & Smith
ATTORNEYS

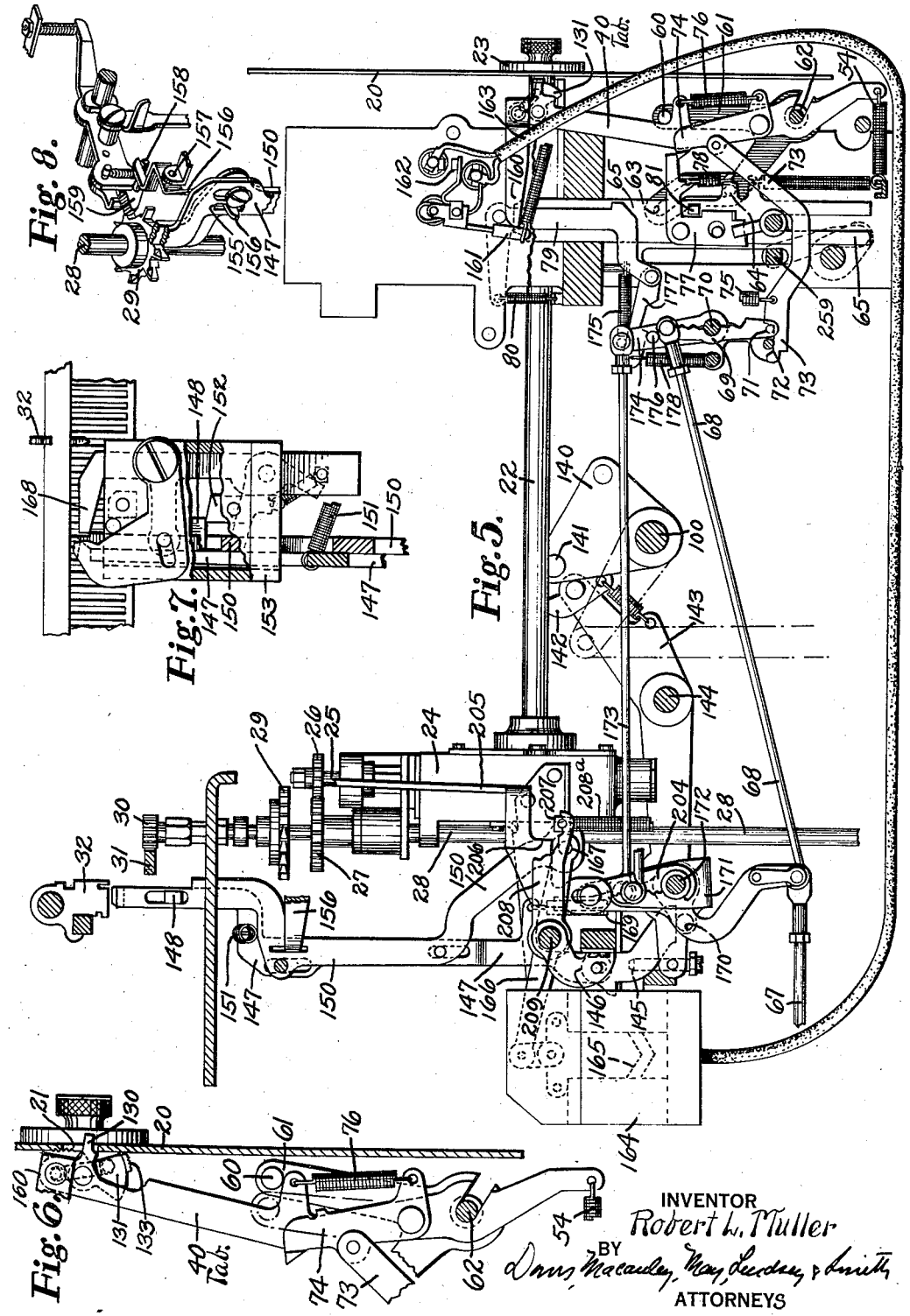

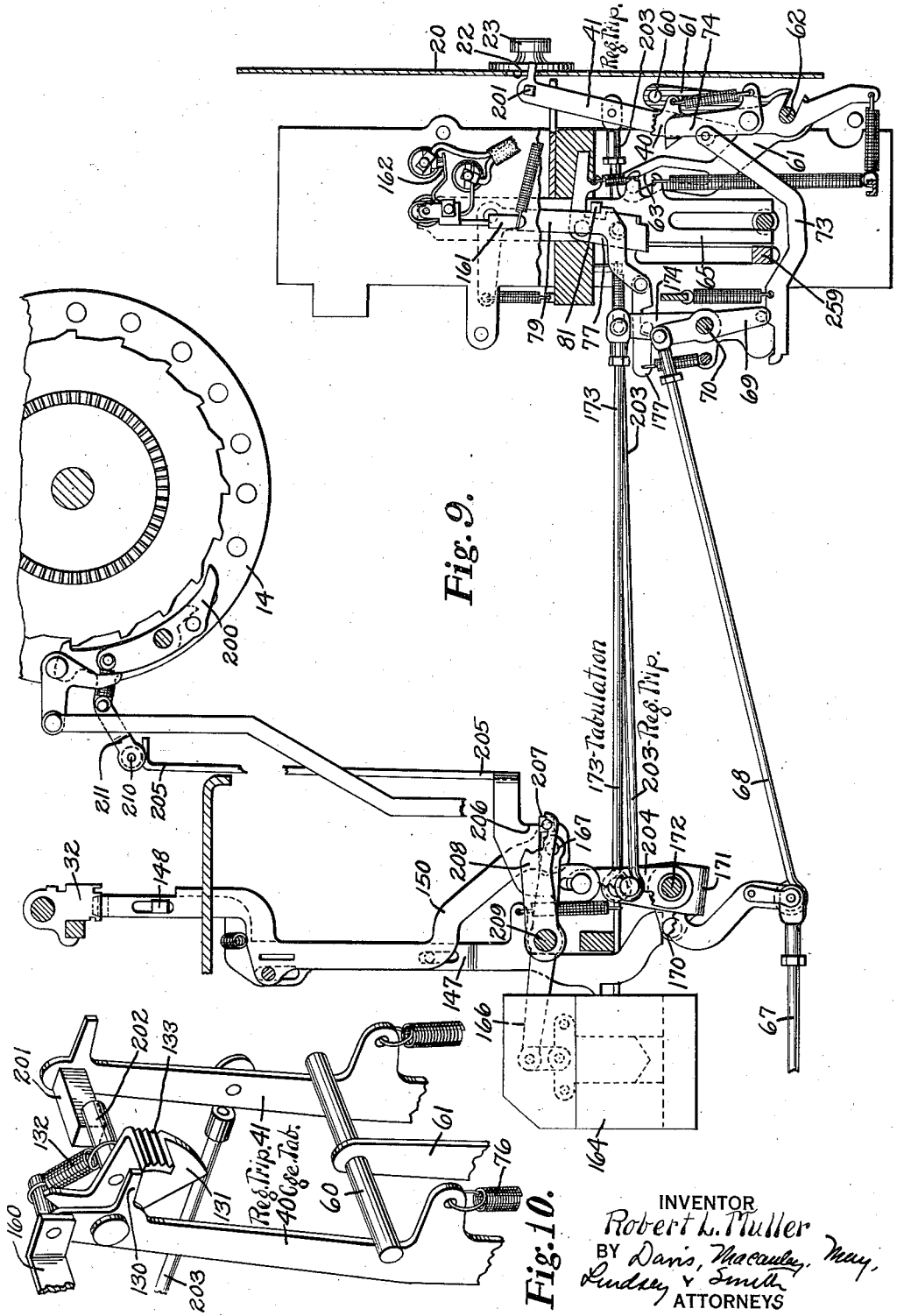

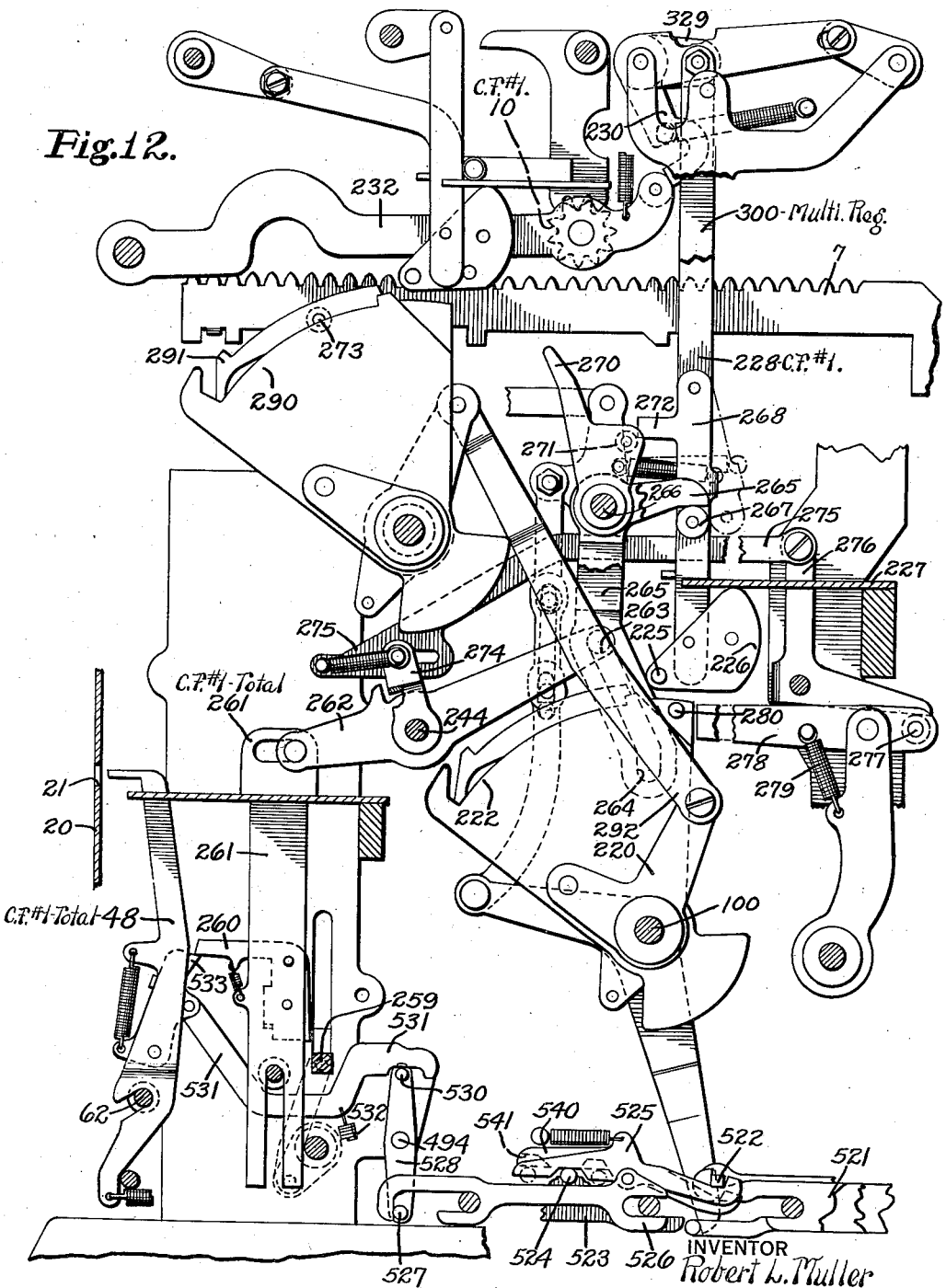

Jan. 28, 1941.  R. L. MULLER  2,229,762
CALCULATING MACHINE
Filed Nov. 23, 1935  10 Sheets-Sheet 8
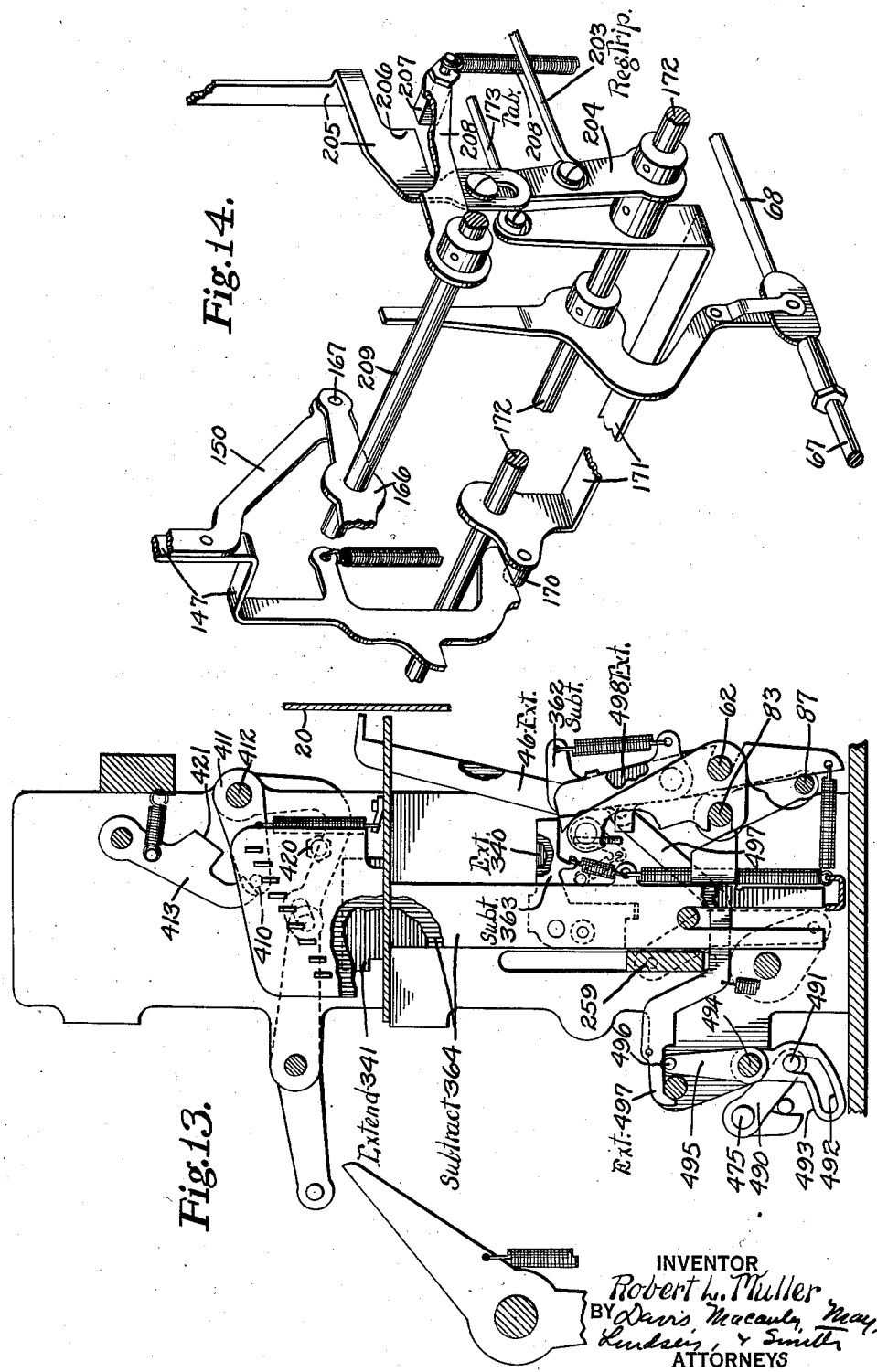

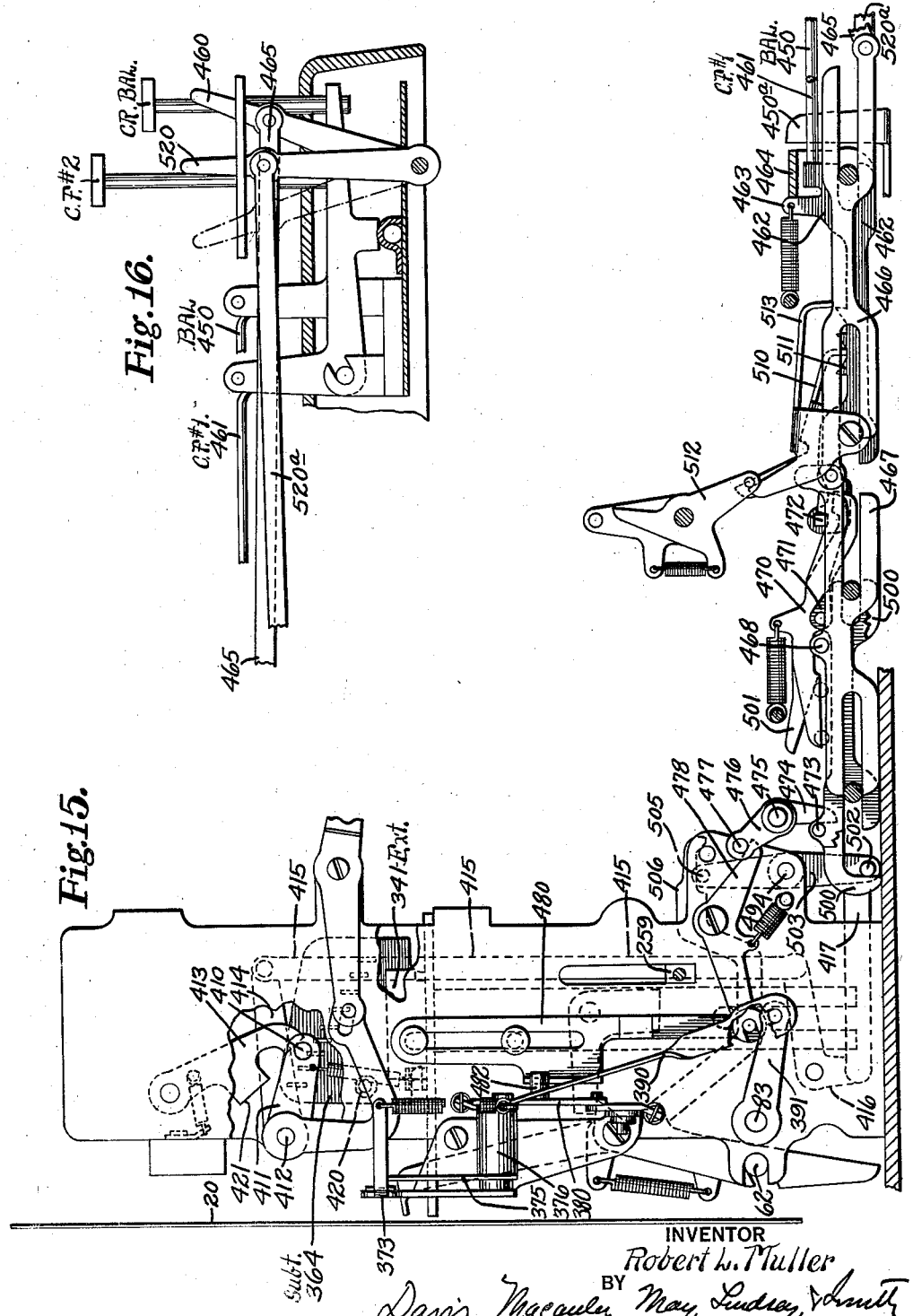

Jan. 28, 1941. R. L. MULLER 2,229,762
CALCULATING MACHINE
Filed Nov. 23, 1935 10 Sheets-Sheet 10

INVENTOR
Robert L. Muller
BY Davis, Macauley, Marg, Lindsey, & Small
ATTORNEYS

Patented Jan. 28, 1941

2,229,762

UNITED STATES PATENT OFFICE 2,229,762

CALCULATING MACHINE

Robert L. Muller, Detroit, Mich., assignor to Burroughs Adding Machine Company, Detroit, Mich., a corporation of Michigan Application November 23, 1935, Serial No. 51,263

35 Claims. (Cl. 235—60)

This invention relates to a calculating machine, and particularly to automatic means for conditioning the machine to perform predetermined functions in accordance with a predetermined program, provision being made for enabling the operator to readily change the program in such a way that he can completely change the automatic functioning of the machine, including the columnar printing, by simply removing one program controlling means and substituting another.

Calculating machines have, heretofore, usually been conditioned automatically by having the paper carriage actuate certain devices that condition the machine to perform different functions. This places a load on the paper carriage that interferes with its proper operation. The load varies between different columns and, while the carriage spring might be made strong enough to move the carriage rapidly with a maximum load, the result would be a too rapid action with smaller loads. In practice, the load on the carriage places a limit on the speed of operation of the carriage.

The present invention is directed to a solution of this problem and it contemplates providing an indexing means in the form of a perforated disk which is indexed by the carriage, after which the disk is automatically sensed by a sensing means that conditions the machine to perform predetermined functions in accordance with the program on the disk. The construction is such that one perforated disk may be readily removed and another substituted to completely change the program of the machine, including the tabulating movements of the paper carriage.

The general object of the invention is to provide an improved automatic function controlling means for calculating machines.

A more particular object is to provide an improved function control in which the program member is in the form of a perforated disk that is automatically positioned in accordance with columnar printing after which said disk is sensed to condition the machine to perform predetermined functions.

Other and more particular objects of the invention will appear from the following specifications and drawings.

An embodiment of the invention is shown in the accompanying drawings in which:

Figure 1 is a left side elevation of a machine with the invention applied thereto;

Fig 1ª is a partial plan view of the keyboard shown in side elevation in Fig. 1;

Fig. 5 is a partial right side elevation and section showing particularly the controlling means for tabulating the carriage, the parts being in normal position;

Fig. 6 is a detail right side elevation and section of one of the sensing members controlling the carriage tabulation, the sensing member being shown in sensing position;

Fig. 7 is a front detail of the tabulating stop mechanism, the parts being shown in the position they occupy while the carriage is being tabulated from one column to the other;

Fig. 8 is a detail perspective of the carriage escapement mechanism;

Fig. 9 is a partial right side elevation and section showing the rotatable register magazine and the automatic control therefor, the parts being shown in the position they occupy at the time the carriage is arriving at a new columnar position and during a partial escapement of the register magazine indexing means;

Fig. 10 is a detail perspective view of the sensing means for controlling the tabulating of the carriage and selection of the multiple register;

Fig. 12 is a partial left side elevation and section similar to Fig. 11 showing the controls for conditioning the machine to take a total from the main register;

Fig. 13 is a partial right side elevation and section showing the "extend" and "subtract" mechanism in normal position;

Fig. 14 is a partial perspective showing the parts at the forward part of Fig. 5 more clearly;

Fig. 15 is a partial left side elevation of the extend and subtract mechanism together with a manual control for certain of the parts;

Fig. 16 is a detail view of a portion of the keyboard showing the manual controls which are connected to the mechanism illustrated in Fig. 15.

The invention is shown applied to a machine of the type known generally as the Burroughs-Moon-Hopkins billing machine, the general features of which are disclosed in Hopkins Patent No. 1,336,904. It is to be understood, of course, that the invention may also be applied to other types of machines.

The present application relates to the same generic subject matter as my copending application, Serial No. 35,433, which discloses another specific embodiment of my invention. The broad claims to the subject matter common to my said copending application and the present application are contained in the present application.

GENERAL CALCULATING MACHINE FEATURES

The machine is a ten-key type of calculating machine having a typewriter section by means of which descriptions of the calculating operations may be written.

Figure 1:
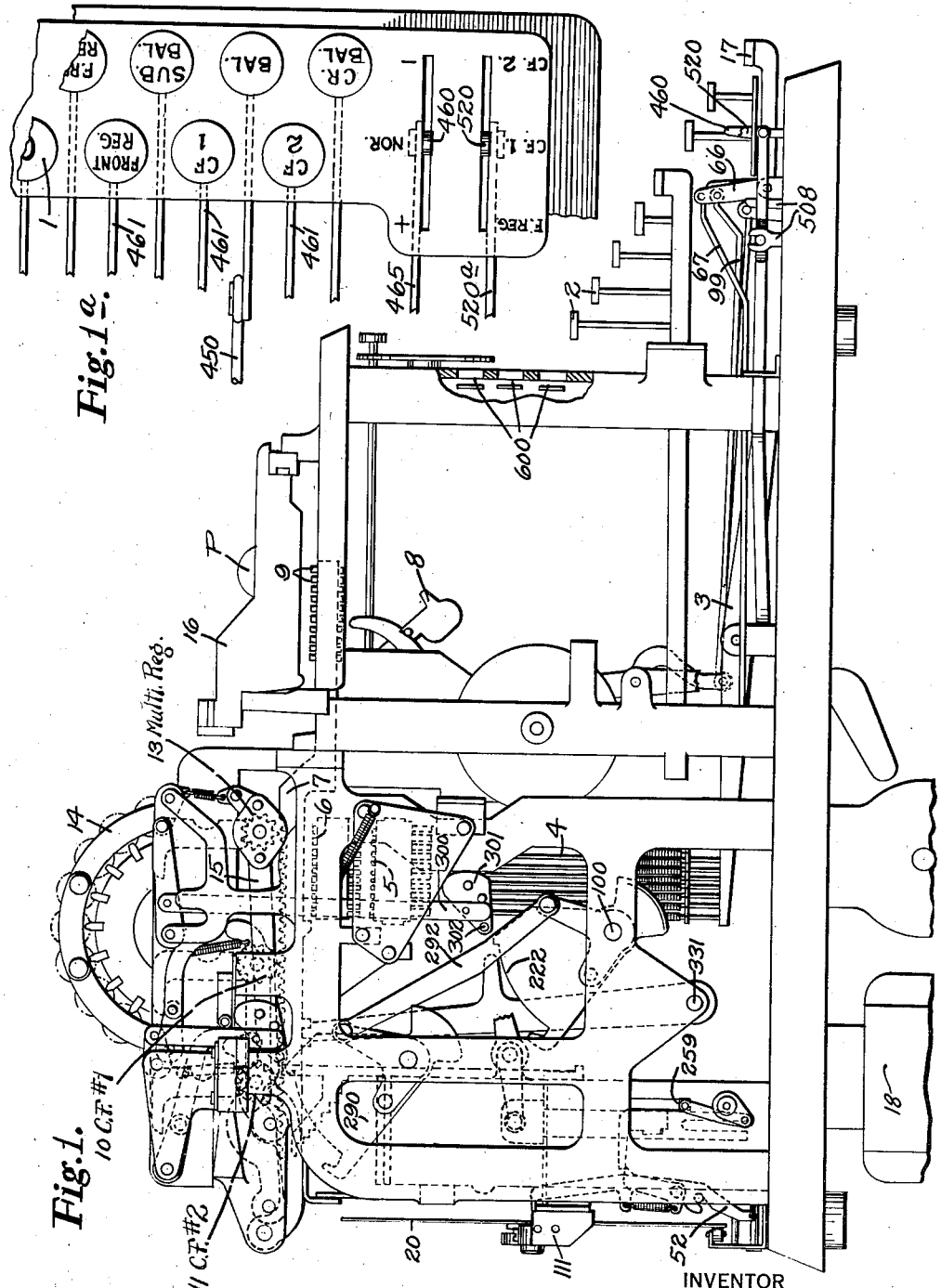

It is provided with a set of amount keys 1 (Fig. 1a) and a set of type keys 2 (Fig. 1). The amount keys, when depressed, rock their respective lever 3 to move their respective thrust bars 4 upward. The latter set, or index, pins in a traveling pin carriage 5 (Fig. 1). At the beginning of a cycle of machine operation this traveling pin carriage is raised and its indexed pins set up corresponding pins in a stationary field of stops 6 (Fig. 1) that control the forward movement of actuator racks 7 (Fig. 1). After the stops 6 have been indexed, the actuator racks are released for forward movement to differential positions determined by the indexed stops 6 and, after the racks have been positioned, a printing mechanism, of which a portion is shown at 8 in Fig. 1, operates to drive the indexed types 9 on the forward ends of the actuator racks into engagement with paper held about a platen P.

The machine has two main registers, or "cross-footers," 10 and 11 which, for purposes of convenience, will be called main register No. 1 and main register No. 2 respectively. Suitable tens-transfer mechanism is provided for the registers and they are also provided with controls and register moving mechanisms by means of which they can be moved into and out of engagement with the actuator racks at the appropriate time to perform addition, subtraction, take totals and sub-totals.

The machine also has a plurality of multiple registers 13 contained in a rotatable magazine 14 that may be indexed to bring any register to an indexed position, after which it is automatically moved to active position relative to the actuator racks in order that operations may be performed on it. After such operations have been performed the register is returned to the magazine. The indexed multiple register is moved out of the magazine into a register moving frame 15 (Fig. 1) that is provided with suitable mechanism for moving the indexed register into and out of engagement with the actuator racks at the appropriate time to perform calculations such as addition, subtraction, and total taking. This multiple register mechanism is described in detail in Muller Patent No. 1,920,477.

Subtraction may be performed on both of the main registers and upon the multiple registers by a process of complemental addition in the manner described in said Hopkins and Muller patents, it not being considered necessary to go into the details of this mechanism for an understanding of the present invention.

Column printing control means is provided for controlling the columns in which printing occurs upon the paper held about the platen P. For this purpose a traveling paper carriage 16 (Fig. 1) is provided which is controlled by a tabulating mechanism hereinafter described and the general features of which are disclosed in Thieme Patent No. 1,259,929. In connection with the control of this carriage it should be borne in mind that the carriage can be tabulated for calculating operations and it also has a letter space escapement in order that it may be moved while the type keys are being employed. Control of the carriage thus involves a control of the letter space escapement mechanism as well as the control of the mechanism for tabulating the carriage to different columnar position.

The machine may be given cycles of operation by hand or by a motor, the latter being the preferable construction and the one shown in Fig. 1, where the machine is provided with a motor bar 17 which, upon depression, causes a motor 18 to give the machine a cycle of operation. The type of motor driving mechanism used is described in detail in Thieme Patent No. 1,283,597.

INDEXING MEANS FOR AUTOMATIC CONTROL OF MACHINE FUNCTIONS

An indexing means is provided for determining the machine function program and this indexing means is automatically indexed under the control of a movable device that normally moves during each machine cycle. The movable device in the embodiment of the invention shown is the traveling paper carriage which indexes a circular disk 20 (Figs. 1 and 2) provided with indexing configurations in the form of openings or perforations 21. It is to be understood that the term "configurations" as used herein shall include studs, lugs, profiled edges, portions raised above or depressed below the remainder of the surface, or other differentiating configurations, as well as perforations or slots. The perforations are located along different radii of the disk and at different distances from its axis of rotation. The number of perforations on any given radius depends upon the machine functions desired for that position of the disk.

The indexing disk is removably secured to the end of a rotatable shaft 22 (Fig. 5) by means of a clamping plate 23 that is threaded onto the end of the shaft and provided with a knurled knob by means of which it may be easily manipulated. The shaft 22 is connected by means of gears in a gear box 24 (Fig. 5) to a shaft 25 having a gear 26 on its upper end meshing with a gear 27 on the escapement shaft 28. The shaft 28 carries the escapement wheel 29 for determining the letter space positions of the carriage.

The shaft 28 also has a gear 30 on its upper end meshing with a rack 31 on the paper carriage. The rack 31 rotates the gear 30 whenever the paper carriage moves and, since this gear rotates shaft 28 to which gears 27, 26 and the shaft 22 are connected, the indexing disk 20 is always moved when the paper carriage is moved.

The carriage is arrested in its columnar positions by tab stops 32 in a manner hereinafter described.

The indexing disk is very light. The small load it places on the carriage is negligible. Its circular character and its position at the rear of the machine enable it to control a large number of functions in a minimum space. Also, its position and location enable one disk to be readily removed and another inserted to thereby change the complete program of the machine very quickly. The disk itself does not operate any of the function controls of the machine and thus no load is placed upon the carriage in the actuation of mechanism for conditioning the machine to perform different functions.

SENSING MEANS FOR FUNCTION CONTROL

Figure 2:
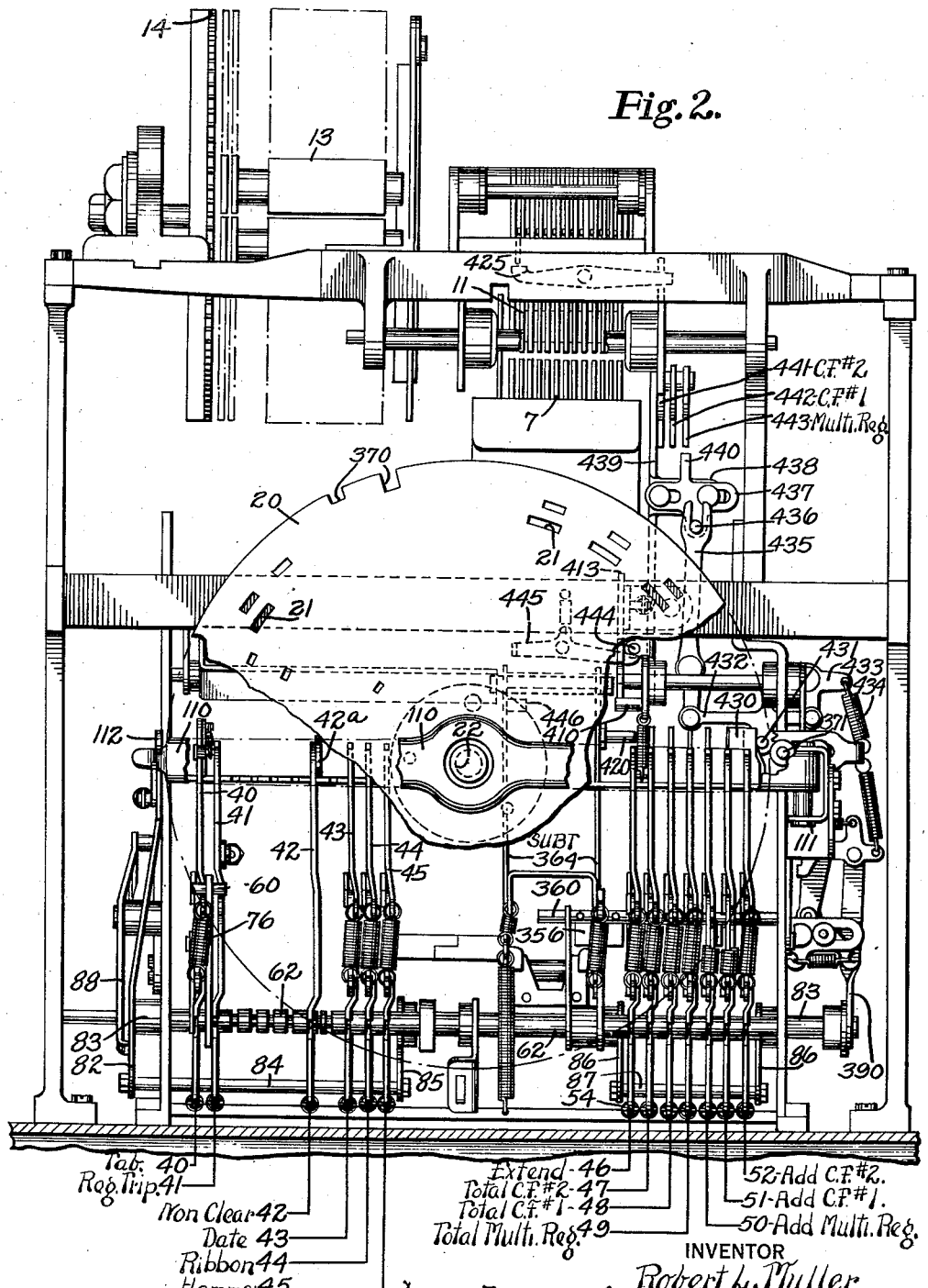
Fig. 2 is a partial rear elevation of the machine showing the program disk partly cut away in order to show the sensing members more clearly.

The index disk 20 is sensed by a sensing means comprising a plurality of sensing members of which thirteen are shown in Fig. 2. The sensing members bearing the reference numerals below control the respective machine functions set opposite each:

40 Columnar printing or carriage tabulation
41 Multiple register selection
42 Register non-clear lock
43 Automatic date
44 Red or bichrome ribbon
45 Hammer block of printing mechanism
46 Extend operation
47 Total of main register No. 2
48 Total of main register No. 1
49 Total multiple register
50 Addition in multiple register
51 Addition in main register No. 1
52 Addition in main register No. 2

The sensing members are urged toward the disk 20 but are normally held out of engagement with the disk by mechanism that will be presently described. As an incident to operation of the machines, the sensing members are released for movement toward the disk. In the embodiment shown, the release of the sensing members occurs automatically upon depression of the motor bar.

The sensing members are urged toward the index disk 20 by springs 54 such as the spring 54 shown in Fig. 5 for the sensing member 40. Normally, however, the sensing members are held out of engagement with the disk by suitable bails which will now be described.

The sensing members 40 and 41 for the "column printing control" mechanism and the "multiple register selection" are normally held out of engagement with the indexing disk by a bail 60 shown in Figs. 2 and 5. This bail is carried on the end of one arm of a bell crank lever 61 pivoted on a shaft 62. The other arm of this bell crank has an inclined cam slot 63 in it with which a stud 64 on a vertical slide 65 cooperates. When the parts are in the position of Fig. 5, the bail holds the sensing members 40 and 41 out of engagement with the indexing disk 20. If the slide 65 is raised upwardly, its stud 64 operating in the cam slot 63 rocks the bell crank 61 clockwise and releases the sensing members. The slide 65 is moved upwardly during the initial part of the cycle of machine operation under the control of the motor bar as follows:

When the motor bar 17 (Fig. 1) is depressed, the bell crank 66 is rocked clockwise as viewed in Fig. 1 and the rod 67 is pulled forward. This rod is connected to a second rod 68 (Fig. 5) extending rearwardly to where it is connected to a lever 69 pivoted on a stationary shaft 70. The lower end of the lever 69 carries a stud 71 operating in a slot 72 in the edge of a member 73 pivoted at its rear end to a latch 74 and urged clockwise by a spring 75. The latch 74 is pivoted on the sensing member 40 and is urged counterclockwise by a spring 76. The upper end of the latch 74 has a nose positioned under one end of a bell crank pawl 77 urged clockwise by a spring 78.

When the motor bar is depressed, rods 67 and 68 are pulled forward, which rocks the lever 69 counterclockwise and pushes the member 73 rearward. This rocks the nose of latch 74 out from under pawl 77 and the latter is thereupon rocked clockwise by its spring 78 so that its downwardly extending arm moves over a bail 259 which is raised very early in the cycle of machine operation, as described in Hopkins Patent No. 1,336,904, where said bail bears the reference number 259. As the bail 259 moves upwardly it engages the end of the bell crank pawl 77 and raises the slide 65 upwardly. The stud 64 operating in the cam slot 63 then rocks bell crank 61 and bail 60 clockwise to move bail 60 out of engagement with the sensing members 40 and 41 to release them for movement to sensing position.

The slide 65 is latched in its upper position by a latch 79 urged counterclockwise by a spring 80 and adapted to engage under a square stud 81 on the slide 65, as shown in Fig. 9.

The two sensing members 40 and 41 and the mechanism just described are restored to normal toward the end of the cycle of machine operation by mechanism which will be described at the time the control of columnar printing is explained.

The sensing member 42 (Fig. 2) is a special member that operates slightly differently than the other members. It controls a register-non-clear lock whose details have not been shown. The member 42 is urged toward the index disk 20 in the same manner as members 40 and 41, but is not held out of engagement with the disk. Instead it has a roller 42ᵃ on its upper end which engages the disk lightly and does not retard its rotation. When the disk moves around to a point where there is a slot opposite roller 42ᵃ, the roller will move into the slot, provided the register is not clear, and will set a lock. If the register is clear, the sensing member does not move. The sensing member 42 is restored by movement of disk 20 which causes roller 42ᵃ to roll out of the slot in which it is moved. This special sensing member is not used except where a program is desired in which, after certain operations, the active register should be clear and it is desired to prove that fact.

Figure 3:
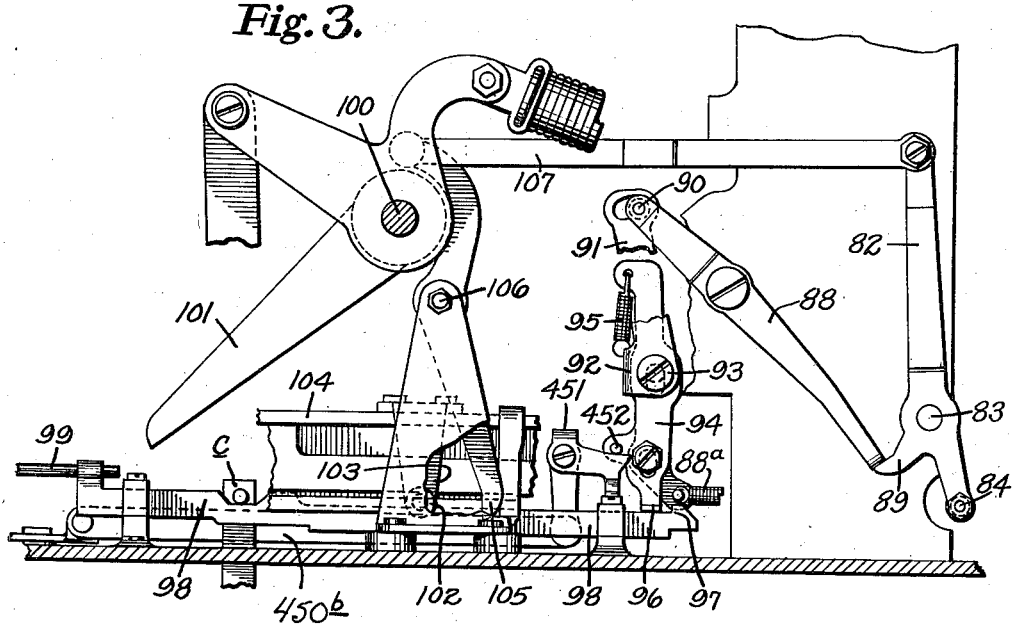
Fig. 3 is a detail side elevation and section showing the means for holding the sensing members away from the indexing disk while the paper carriage is being moved.

The remaining sensing members, that is 43 to 52, inclusive, are released and restored by mechanism as follows:

Referring to Fig. 3, a lever 82 is fixed to a shaft 83 that extends across the machine. The downwardly extending end of this lever carries a shaft or bail 84 extending under the tails of the sensing members 43, 44 and 45 as shown in Fig. 2, the other end of said shaft being supported by an arm 85 also fixed to the shaft 83. The tails of the sensing members 40, 41 and 42 are shaped so that they are not engaged by shaft 84. The shaft 83 also has two arms 86 fixed to it (Fig. 2) which carry a shaft or bail 87 extending under the tails of the sensing members 47 to 52, inclusive. Thus, when the shaft 83 is rocked clockwise (Fig. 3) both the bail 84 and the bail 87 are moved away from the sensing members to release them for movement toward sensing position.

The lever 82 (Fig. 3), which is fixed to shaft 83, is normally held against movement by a latch 88 having a bent end that engages a projection 89 on the lever 82. The latch 88 is released by depression of the motor bar. For this purpose it carries a stud 90 on its upper end operating in a slot in one arm 91 of a yoke 92 pivoted at 93. This yoke carries a slide 94 urged downwardly by a spring 95, the lower end of said slide having a lateral lug 96 adapted to be engaged by a shoulder 97 on a slide 98. Referring to Fig. 1 the bell crank 66 that is rocked by the motor bar 17 has a rod 99 connected to it which, at its rear end, is connected to the slide 98 (Fig. 3).

Figure 4:
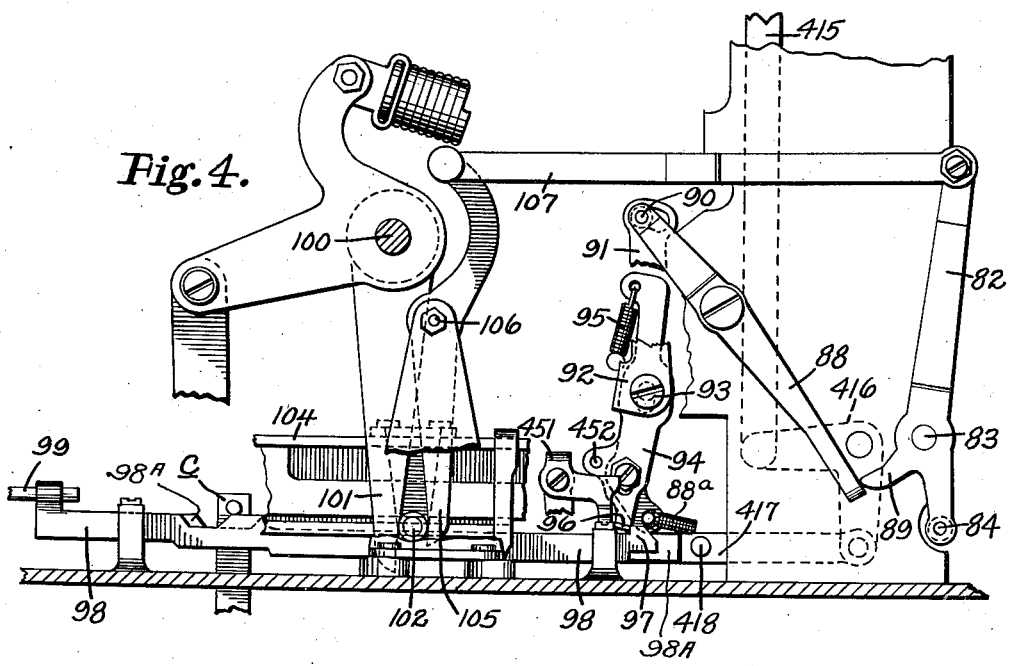
Fig. 4 is a view similar to Fig. 6 showing the parts in the position they occupy with the sensing means released during a machine operation.

With this arrangement, when the motor bar 17 is depressed, slide 98 moves forward and the shoulder 97 engages lug 96 to rock yoke 92 clockwise. This rocks the latch 88 clockwise and releases the projection 89 on arm 82, whereupon the bails 84 and 87 are released. The sensing members then move under the urge of their springs to sensing position, the bails 84 and 87 being carried with them. The position of the parts where released is shown in Fig. 4. It is to be noted that, when the slide 98 is moved forward from its Fig. 3 to Fig. 4 position, the clutch control bar C is operated to cause the machine to be given a cycle of operation.

The bails 84 and 87 and the sensing members 43 to 52, inclusive, are restored to normal during the latter part of the cycle of the machine operation. The machine has a shaft 100 (Fig. 3) (numbered 81 in Patent No. 1,336,904) which is rocked during each cycle of operation, the movement first being counterclockwise as shown in Fig. 3 and then clockwise. Fixed to this shaft is an arm 101 which, during the first half of the cycle, engages a stud 102 on an arm 103 which moves the slide 104 to restore the indexed pins in the traveling pin carriage to normal. As this stud 102 moves rearwardly from the position of Fig. 3 to that of Fig. 4 it engages the end of a lever 105 pivoted at 106. The upper end of this lever is connected by link 107 to the upper end of the lever 82. The result is that, near the end of the first half of the cycle of machine operation, the lever 105 is rocked counterclockwise, the link 107 is pulled forward, and the lever 82 together with the bails 84 and 87 is rocked counterclockwise to restore the sensing members to normal position. As already explained, the rocking of the yoke 92 clockwise from the position of Fig. 3 to the position of Fig. 4 is caused by the shoulder 97 engaging the lug 96 on the slide 94 when the motor bar is depressed. During the later part of the depression of the motor bar, the lug 96 encounters a cam means (not shown) which during the continued movement of the parts cams the slide 94 upward on the yoke 92 against the tension of the spring 95 until the lug 96 slips over the shoulder 97 so that the yoke 92 is released from control of the motor bar. However, the end of the projection 89 of the lever 82, while the latter remains in the position of Fig. 4, holds the latch lever 88 against return to normal but when the lever 82 is rocked counterclockwise near the end of the machine cycle by the link 107 as explained above, the end of the projection 89 moves downward past the latch 88, which then is moved counterclockwise by a spring 88ª (Fig. 3) to hold the lever 82 in restored position. Thus, the lever 82 and the sensing levers 43 to 52 controlled thereby will be relatched in normal position regardless of whether or not the operator releases the motor bar as intended before the end of the forward stroke of the cycle of operation.

From the description thus far given, it will be clear that the sensing members 43 to 52 are released immediately upon depression of the motor bar so that they may move to position very quickly. The sensing members 40 and 41 are conditioned for release by the motor bar and then fully released at the start of the cycle of machine operation so that these members, which control the selection of the multiple registers and the carriage tabulation, will be ready for operation when the index disk 20 moves near the end of the machine cycle. They thus act to control the next tabulation of the carriage and the selection of the multiple registers for the next machine cycle. The release of all the sensing members is such as to enable the sensing members to condition the parts controlled by them so that said parts will properly operate during the cycle of machine operation.

The sensing members 43 to 52, inclusive, are restored very early in the cycle of machine operation, that is, near the end of the first half of the cycle. The indexing disk 20 is thus freed of the sensing members in plenty of time for an early movement during the cycle. The sensing members 40 and 41 for the column printing control and the selection of the multiple registers are restored separately as will presently appear.

Each sensing member has a nose adapted to move through the perforations 21 in disk 20 that, at the time, are aligned with the noses. If there is an opening in the disk corresponding to a given sensing member, the nose of that member will move through the opening and the member will condition the machine to perform the function that it controls. If there is no opening corresponding to a sensing member, the nose of that member will move into engagement with the disk but will not move to condition the machine to perform the function controlled by it. Thus the sensing members either move to positions to condition the machine or are held from moving by contact with the disk.

As will be evident from Figs. 2 to 5, the sensing members are mounted so as to move rearwardly toward the disk 20 which, itself, is at the rear of the machine. Since the disk is made of relatively light material, provision is made for reinforcing it in the neighborhood of the openings which, at any particular time, are in position to cooperate with the sensing members. For this purpose a reinforcing bar 110 (Fig. 2) is provided which is pivoted on a vertical pivot 111 and arranged to be latched in position at its other end by a latch 112. The bar can be easily swung away from the disk to permit one disk to be removed and another inserted. This bar carries a series of rollers 113, best shown in the lower left-hand corner of Fig. 11, arranged to contact the disk between the openings 21 that are in alignment with the noses of the sensing members. Thus the noses which engage the disk because there are no openings corresponding to them do not spring the disk out of shape because the rollers at the back prevent such action. These rollers do not interfere with the rotary movement of the disk when it is moved from one position to the other as they engage it lightly and are, themselves, rotatable.

Further description of the sensing means will be given in connection with the description of the automatic control of different functions.

AUTOMATIC CONTROL OF COLUMNAR PRINTING

One of the important features of the present invention is that columnar printing is automatically controlled by the indexing and sensing means through control of the tabulation of the paper carriage, so that the program of carriage tabulation is changed in accordance with the tabulating program of the disk that is in use without requiring that the tab stops on the carriage be changed.

The sensing member that controls the carriage tabulation is member 40 (Fig. 2), shown in detail in Figs. 5 and 6, to which reference is now made. This sensing member is urged clockwise as viewed in Fig. 5 by the spring 54, but is normally restrained by the bail 60 heretofore described. The upper end of the sensing member has a nose 130 (Fig. 6) adapted to move through openings in the index disk 20 when an opening is opposite said nose. As already explained, the sensing member 40 is released during the early part of a cycle of machine operation. At that time the indexing disk 20 is stationary, it having been positioned by the previous tabulating movement of the carriage. It is possible that an opening in the disk may be opposite the nose 130 of the sensing member at the time it is released, but the nose should not pass through such opening because this opening is one which has just caused the carriage to stop in the position it then occupies. The sensing member should not act until the next opening comes to position.

In order to prevent the sensing member from moving into the wrong opening, it is provided with a shield 131, shown most clearly in Fig. 10. This shield is pivoted to the upper end of the sensing member 40 and urged counterclockwise by a spring 132. It has a lateral lug 133 on it that normally occupies a position in front of the nose 130 of the sensing member. The outer surface of this lug is serrated as shown in Fig. 10. When the sensing member 40 is released, this shield engages the index disk 20 and prevents the nose from entering an opening if there is an opening opposite it.

During the latter part of the cycle of machine operation, the tabulating mechanism of the machine is operated to release the paper carriage to enable it to move to the next columnar position. In so moving, the carriage rotates the indexing disk 20. The disk 20 has some serrations on its face (Fig. 6) corresponding to serrations on the lug 133. As the disk rotates, its serrations engage those of the lug 133 and move shield 131 to the position of Fig. 6 so as to uncover the nose 130 of the sensing member 40 to permit the latter to move against the index disk 20, the opening in the disk that was previously in front of the nose 130 having, in the meantime, moved away from it. The nose of the sensing member is then in position to drop into the next opening in the disk as soon as the hole moves in front of the nose. When this occurs movement of the carriage is stopped as will presently appear.

It will be appreciated that there could be an opening in the next position of the disk, or one or more columnar positions could be skipped before an opening came around to position. The indexing disk thus controls the regular columnar positioning of the paper carriage as well as the skipping of predetermined columns. Control of the carriage movement can, of course, be varied by changing the disks.

Returning now to the condition of the machine when the sensing member 40 has been released but while it is still prevented from moving into an opening in disk 20. As the machine goes through its cycle the carriage is released as follows:

During the cycle of machine operation, the shaft 100 (Fig. 5) is first rocked counterclockwise from the position in Fig. 5 and then returned clockwise. This shaft has a plate 140 fixed to it carrying a stud 141 adapted to engage a pass-by pawl 142 mounted on the end of a lever 143 pivoted at 144. During the first half of the machine cycle the stud 141 passes the pawl 142 without affecting the lever 143 but, during the second half of the cycle, the stud engages the pawl 142 and rocks lever 143 clockwise as viewed in Fig. 5. The left-hand end of lever 143 carries a set screw, or stud, 145 whose upper end is adapted to engage a roller 146 mounted on a vertically movable slide 147. The upper end of slide 141 carries a square stud 148 extending through a slot in another slide 150 that will be presently described. Both of the slides 147 and 150 are free to be moved laterally a limited extent at their upper ends, the slides being urged to the right in Fig. 7 by the spring 151. When the slide 147 is raised by the clockwise movement of lever 143, the stud 148 moves above the upper edge of a stationary abutment 152 supported by the tabulating block 153. When this occurs the upper ends of the two slides 147 and 150 are moved laterally by spring 151, the slide 147 being then held in its upper position by movement of stud 148 over abutment 152 as shown in Fig. 7.

The upward movement of slide 147 disables the escapement that controls the letter space movements of the paper carriage. For this purpose, the slide 147 has a slot 155 in it (Figs. 5 and 8) in which the end of a lever 156 is mounted. This lever is pivoted at 157 (Fig. 8) and the other end of the lever is positioned over a stud 158 on a pawl 159 which normally operates in connection with the escapement wheel 29 on the shaft 28 to control the letter space movements of the carriage. When the slide 147 is raised, the lever 156 is rocked clockwise in Fig. 8 and the pawl 159 is moved downwardly out of engagement with the escapement wheel 29 thereby disabling the escapement mechanism and leaving the carriage free to move as far as the letter space escapement is concerned. When so released, the carriage starts to move under the influence of a spring drum, not shown, and it continues to move until arrested by the tabulating mechanism controlled by the sensing member 40 as will now be described.

The sensing member 40 has an abutment projection 160 on its upper end (Fig. 5) that normally engages an arm 161 of an electric switch having two contacts 162 that are normally separated. The abutment 160 on the sensing member 40 normally holds the switch open but, when the sensing member moves through an opening in the program disk, the switch is released and it moves to closed position. This completes an electric circuit 163 to an electromagnet 164 having a movable core 165. This core is connected to one end of a lever 166 which is secured on shaft 209 and whose other end carries a stud 167 positioned in a slot in the end of the slide 150 mounted alongside of the slide 147. When the electromagnet is energized, the lever 166 is rocked counterclockwise and the slide 150 is moved upwardly to cause its upper end to move into the path of one of the tab stops 32 on the paper carriage as shown in Fig. 9. There is a sufficient number of these stops, usually one for each letter space position of the carriage, so that, when the slide 150 is moved upwardly, it acts to stop the paper carriage in the proper columnar position without requiring any special location of the tab stops. The upper end of slide 150 moves between two closely adjacent stops and there cannot be any rebound of the carriage.

Thus the sensing member 40, in cooperation with the program disk 20, stops the paper carriage immediately when the disk moves around to a position where the nose 130 of the sensing member 40 moves into an opening in the disk.

It is also possible, of course, to have a smaller number of tab stops 32 on the paper carriage and to have these positioned in the columns where it is desired to arrest the paper carriage in one or more forms. In that event, it is not necessary to change the position of these stops when the program is to be changed. One work form may require tab stops for one set of columnar positions and another form may require tab stops for a partly or wholly diffeernt set of columnar positions but, if all the tab stops needed for all of the columnar positions required by both forms are placed on the carriage and a different disk 20 for each form is provided with the appropriate tabulation control openings for the respective form, any tab stops present but not needed for the form being used at a given time will not have any effect on the carriage tabulation. But when there is no tab stop for the letter space position immediately preceding a columnar position in which the carriage is to be arrested by a given tab stop on the carriage, it is desirable to provide some means to prevent rebound of the carriage and, in the embodiment of the invention illustrated, this takes the form of a rebound dog 168 which operates in a similar manner to the one shown in Thieme Patent No. 1,259,929.

When the appropriate tab stop on the carriage moves against the end of the slide 150 (Fig. 9) it moves both the slides 147 and 150 to the left as viewed in Fig. 7. This releases the stud 148 from the abutment 152 and allows the slide 147 to move downward under the urge of its spring 169, while the slide 150 remains in its upper position owing to the fact that the electromagnet 164 is still energized. Downward movement of slide 147 releases the escapement pawl 159 (Fig. 8) and permits the latter to move back into engagement with the escapement wheel 29. Thus the carriage is again placed under the control of the letter space escapement. As the slide 147 moves downwardly its lower end engages a stud 170 (Fig. 14) on an arm of a yoke 171, thereby rocking the yoke counterclockwise on the shaft 172 on which it is pivoted. Another arm of this yoke has a rod 173 connected to it. This rod extends rearwardly (Fig. 5) to where it is connected to a lever 174, the latter being pivoted on shaft 70 and urged clockwise by a spring 175. The lever 174 carries a stud 176 adapted to engage a notch in the pawl 177 pivoted on the latch 79 and urged counterclockwise by spring 178. When the slide 147 was raised, as heretofore explained, the spring 175 moved lever 174 clockwise far enough to position the stud 176 in the notch in pawl 177 (see Fig. 9), the latter being rocked down by its spring 178. As the rod 173 moves forward, or to the left in Fig. 9, the pawl 177 pulls latch 79 to released position which releases the slide 65. The latter then moves downwardly and moves the bail 60 to normal position, which moves the sensing members 40 and 41 out of contact with the program or indexing disk 20.

As the sensing member 40 is moved to normal position, its abutment projection 160 engages the switch arm 161 and opens the switch of the electromagnet 165. This releases the core 165 whereupon a spring 208a (Figs. 5 and 14) connected to an arm 208 secured to shaft 209 rocks the latter and lever 166 to move the slide 150 downwardly. The carriage is thus released from the tabulating mechanism and placed under the control of the letter space escapement mechanism.

As soon as the sensing member 40 is returned to normal, the shield 131 on its upper end (Fig. 10) is returned to the position of Fig. 10 by the spring 132 so that, when the sensing member is again released, the shield is in position to act as heretofore explained.

From the above description of the tabulating mechanism it should be clear that the indexing or program disk controls the regular, as well as the special, tabulating movements of the carriage so that the latter may be stopped in any desired columnar position depending upon the openings in the disk. When one disk is substituted for another, a different columnar control of the carriage may be obtained in accordance with the openings in the second disk. Thus the columnar position of the carriage is controlled in accordance with the program of machine functions on the particular disk inserted in the machine. This avoids the necessity for changing the tab stops on the carriage and enables the operator to completely change the program of his machine by simply exchanging one disk for another.

AUTOMATIC CONTROL OF MULTIPLE REGISTER SELECTION

As previously mentioned, the multiple registers are carried by a rotatable magazine 14. This magazine is urged in a clockwise direction, as shown in Fig. 9, under the control of an escapement pawl 200. The magazine must be indexed after a cycle of machine operation in order that the proper register will be in position for the next cycle. This can be done automatically, under the control of the paper carriage which moves during the latter part of a cycle of operation, as disclosed in Muller Patent No. 1,920,477.

The sensing member 41 (Fig. 9) for the control of the multiple register magazine is released in the same manner as the sensing member 40 for the tabulating mechanism, that is, the depression of the motor bar releases the bell crank pawl 77 (Fig. 5) and, during the early part of a cycle of machine operation, slide 65 is raised to move the bail 60 to release both the sensing members 40 and 41. This release takes place before the program or indexing disk 20 has moved. It is possible that, at that time, an opening may be opposite the nose of the sensing member 41 for the multiple register selection. But the sensing member should not move into this opening because the latter controls the selection of registers for cycle of operation that is taking place, whereas the control to be exercised by the sensing member is a selection of registers for the next operation.

In order to prevent the nose of sensing member 41 from entering an incorrect opening, it is provided with a square stud 201 (Fig. 10) positioned behind a stud 202 on the shield 131 associated with the sensing member 40 for the tabulating mechanism. As long as the shield 131 is in position to prevent the sensing member 40 from moving into the opening in the program disk, it also prevents the sensing member 41 from moving into an opening. Thus, both the sensing members 40 and 41 are prevented from moving into openings that may be present at the time they are first released. As the program disk is rotated during the latter part of a cycle of machine operation, the shield 131 is moved, as heretofore explained, which not only releases the sensing member 40 for movement but it also releases the sensing member 41 for the register selection. When the program disk finally arrives at a position where it is stopped owing to the fact that the tabulation sensing member 40 moves into an opening and causes the slide 150 to engage a tab stop 32 to stop the carriage, the sensing member 41 can move into an opening, if one is present, whereupon the multiple register magazine will be indexed to select the register for the next operation, in the following manner:

The sensing member 41 is connected to a rod 203 (Fig. 9) whose left-hand end, in Fig. 9, is connected to a lever 204 (Fig. 14) pivoted on shaft 172. The upper end of this lever has a stud and slot connection with the lower end of a link 205 (Fig. 14). This link has a shoulder 206 which, when the rod 203 and lever 204 are moved to the right in Fig. 9, moves over a stud 207 on the arm 208 fixed to shaft 209 that is rocked by the electromagnet 164 at the time it rocks lever 166.

Thus, if there is an opening opposite the sensing member 41, the latter moves to the right in Fig. 9 which moves the shoulder 206 over the stud 207 before the movement of the sensing member 40 has withdrawn the abutment 160 sufficiently to permit closing of the switch 162. Then, when the switch is closed to energize the electromagnet 164 as above described and the core 165 moves to rock the lever 166, the shaft 209 and arm 208 to raise the stud 207, the said stud carries with it the link 205. The upper end of this link is positioned beneath a stud 210 (Fig. 9) on an arm 211 that operates the escapement pawl 200 for the multiple register magazine 14. The escapement mechanism is thereby released and the magazine moves toward its next position. The energization of the electromagnet is only a momentary one and, when it is de-energized and the spring 208a pulls stud 207 downward, the link 205 moves downwardly, thereby permitting the escapement mechanism to complete its cycle. The restoration of the bail 60, as already described, restores the sensing members 40 and 41 and the latter, through the rod 203, rocks the lower end of the link 205 forward to its normal position where the shoulder 206 is free of the stud 207.

In the event there is no opening in the program disk 20 for a selection of multiple registers, the sensing member 41 does not move far enough to move the shoulder 206 over the stud 207 and the link 205 will not be raised. The register magazine will then remain in the position it occupied during the previous operation.

At this point, attention is called to the control of the sensing members 40 and 41, which control carriage tabulation and multiple register selection, respectively, as compared with the control of the other sensing members' functions that, for purposes of convenience, will be called the calculating functions.

The sensing members that control the calculating functions are released by depression of the motor bar before the machine cycle starts and thus act immediately to condition the machine for the required calculations. These members are then restored very early in the machine cycle, in fact, near the end of the first half of the cycle.

On the other hand, the sensing members 40 and 41, which control carriage tabulation and multiple register selection, are not released until the early part of the machine cycle. They are prevented from acting until the program disk is moved, whereupon they are freed. The disk is not moved until the latter part of the machine cycle and hence these sensing members 40 and 41 act after the members 43–52, inclusive. After they have acted, the members 40 and 41 are restored at the end of the carriage tabulation.

In other words, one group of sensing members is released and restored independently of the other and at a different time during the cycle. One group also acts to control its functions at a different time than the other. This enables the regular carriage tabulation, as well as skip-tab operations, to be controlled by a sensing means that senses the same indexing means that controls the calculating functions. Also, it enables selection of multiple registers to be controlled by a sensing means that senses the indexing means that controls the calculating functions.

AUTOMATIC CONTROL OF FUNCTIONS OF MAIN REGISTER No. 1

Figure 11:
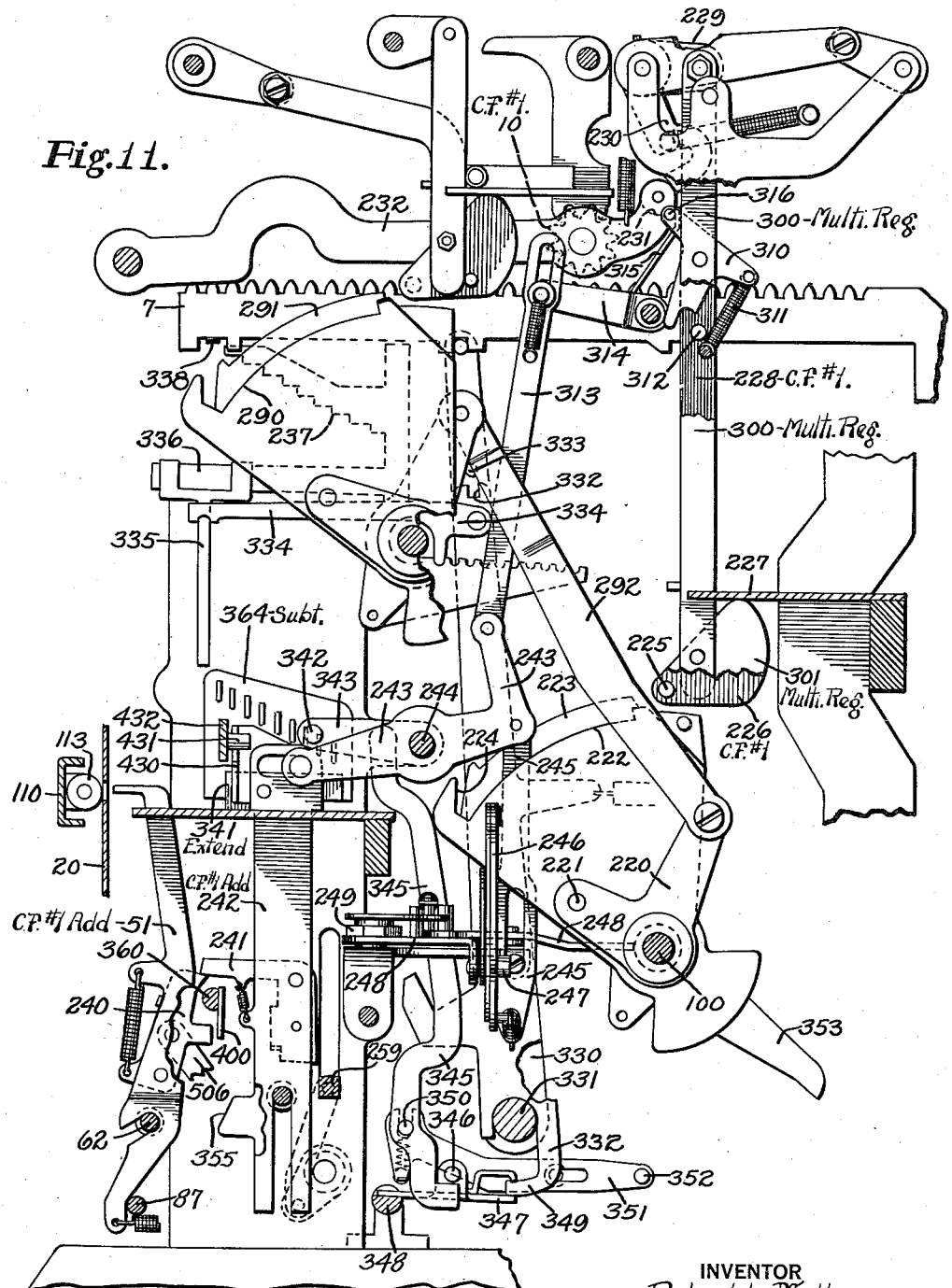
Fig. 11 is a partial left side elevation and section showing the controls for adding and non-adding the main register.

Main register No. 1 is automatically controlled by the indexing disk and sensing means with regard to its add, non-add and total features, as follows:

Referring to Fig. 11, the drive shaft 100, which is rocked clockwise and then returned counterclockwise during each cycle of machine operation, is provided with a bell crank 220 carrying a shaft 221 connected to two cam plates 222 and 223 mounted to rock about shaft 100. These cam plates are mounted so as to rock with the shaft 100 while, at the same time, they are movable laterally to different positions. The cam 223 controls the operation of the transfer mechanism for the main register No. 1 and the cam 222 controls the engagement and disengagement of main register No. 1 with the racks and, for this purpose, it has a hooked end 224 adapted, under certain conditions, to engage a stud 225 on a pawl 226 near the end of the first half of a cycle of machine operation. When stud 225 is so engaged, the pawl 226 is rocked counterclockwise, and this pawl, bearing against the stationary member 227 as a fulcrum, pulls downwardly on a link 228 connected to a bell crank 229—230 which acts on the roller stud 231 in the frame 232 of main register No. 1 to rock said register into engagement with the actuator racks.

The cam 222 is normally positioned so that it will not engage the stud 225, and hence, normally it does not act on the pawl 226, which means that main register No. 1 is normally non-added. Accordingly, as long as the program or index disk 20 has no opening in it, the sensing member for controlling the No. 1 main register is not allowed to move and said register remains in non-add condition.

The sensing member for controlling the add function of the No. 1 main register is the member 51 shown at the left lower corner of Fig. 11. When an opening in the program disk 20 is opposite the nose of this sensing member, the latter, when released, moves counterclockwise from its Fig. 11 position. This moves a shoulder on a latch 240 from under the bell crank pawl 241 thereby allowing the latter to move over the bail 259 which, as previously explained, is raised during the early part of each cycle of machine operation. As the bail 259 moves upwardly, it moves a slide 242 upward. The latter is connected by a stud and slot connection with one end of a lever 243 pivoted at 244. The other end of this lever is connected to a link 245 which has a lateral extension 246 provided with a cam slot connection with a stud 247 on one arm of a bell crank 248 pivoted on a vertical axis 249. The other arm of this bell crank engages the cam plates 222 and 223 to move them laterally. The arrangement is such that, when the slide 242 is moved upwardly, the link 245 is moved downwardly which rocks the bell crank 248 counterclockwise as viewed from above, which moves the cam plate 222 to the right, viewing the machine from the front. This puts the nose 224 on the cam plate 222 in the path of the stud 225 with the result that, near the end of the first half of the machine cycle, said nose engages the stud 225 and pulls the link 228 downwardly to move the No. 1 main register into engagement with the actuator racks. The register remains in engagement with the racks until near the end of the cycle of machine operation when it is released and restored to normal by a shoulder on the right hand end of cam plate 222.

For total-taking operations, the No. 1 main register must be rocked into engagement with the racks at the beginning of the machine cycle and move out of engagement with them at the end of the first half of this cycle. For this purpose, there is provided another sensing member 48 shown in Figs. 2 and 12 which, when there is an opening in the program disk 20, is permitted to move counterclockwise as viewed in Fig. 12 to release a pawl 260 so that its end moves over the bail 259 that is raised at the beginning of the machine cycle. As this bail rises, it moves a "total" slide 261 upwardly. The upper end of this slide is connected to one end of the lever 262 pivoted at 244. The other end of this lever carries a stud 263 operating in a cam slot 264 in the lower end of one arm of a bell crank 265 pivoted at 266 and having an arm extending over a stud 267 on a pawl 268 pivoted to the link 228 that controls the engagement of the No. 1 main register with the actuator racks. The arrangement is such that, when the slide 261 is moved upwardly by bail 259 at the beginning of a cycle of machine operation, the lever 262 is rocked clockwise which also rocks the bell crank 265 clockwise to pull down on the link 228 to move the No. 1 main register into engagement with the actuator racks at the beginning of the machine cycle. The forward movement of the actuator rack is then limited by the pinions of the No. 1 main register. At the extreme end of the first half of the machine cycle, the pawl 268 is rocked counterclockwise to its dot-dash position of Fig. 12, thereby releasing the link 228 and allowing the main No. 1 register to move out of engagement with the racks. The pawl is released by means of an arm 270 having a stud 271 adapted to engage a projection 272 on the pawl 268. Near the end of the first half of the machine cycle, a stud 273 on a cam hereinafter described engages a tail on the member 270 and rocks it to release the pawl 268.

The rocking movement of the lever 262 (Fig. 12) also disables the pin carriage movement during the totaling operation so that the actuator racks will be allowed to move to positions controlled by the pinions of the No. 1 register rather than by index pins on the pin carriage. A projection on the lever 262 engages an arm 274 connected to one end of a link 275 whose other end is connected to one arm of a bell crank 276 whose other arm is positioned over a stud 277 on a pawl 278 urged counterclockwise by a spring 279. The end of this pawl is normally held in front of a stud 280 on the cam plate 222. This pawl 278 is a part of the regular Moon-Hopkins machine heretofore referred to and it acts, when engaged by the stud 280, to raise the traveling pin carriage to set up the necessary index stops in the stationary field of stops. But, when the machine is conditioned for total-taking, the slide 261 moves upwardly as heretofore explained. This moves the lever 262 with arm 274 clockwise, and pushes the link 275 to the right in Fig. 12. This rocks the bell crank 276 clockwise, and thereby rocks the pawl 278 out of the path of the stud 280 so that the pin carriage is not raised. The result is that no index stops are set up and the actuator racks are left free to be controlled by the pinions of the register.

AUTOMATIC CONTROL OF THE FUNCTIONS OF MAIN REGISTER NO. 2

Main register No. 2 is controlled with respect to its add, non-add, and totaling operations in the same general way as main register No. 1.

The No. 2 main register and its transfer mechanism are controlled by cam plates 290 and 291 shown in Fig. 11, which are moved laterally under the control of a sensing member 52 (Fig. 2) in the same way as cam plates 222 and 223 heretofore described for the No. 1 main register, for an add operation.

A total-taking sensing member 47 (Fig. 2) is provided for the main register No. 2 which controls parts similar to those for main register No. 1. The cams 290 and 291 are operated from bell crank 220 through a link 292. In order to avoid duplicate illustrations and descriptions, the details of the connections and controls for the main register No. 2 have not been shown as they are of the same general type as those for main register No. 1.

AUTOMATIC CONTROL OF FUNCTIONS OF SELECTED MULTIPLE REGISTER

The add, non-add, and total taking functions of the selected multiple register are controlled in the same manner as for the No. 1 main register.

As previously mentioned, when a multiple register is selected, it is moved into a frame 15 (Fig. 1) that is rocked to engage the register with and disengage it from the actuator racks. This frame is controlled by a link 300 (Fig. 11) which, in turn, is controlled by a pawl 301 adapted to be actuated by the cam 222. A sensing member 50 (Fig. 2) is provided for controlling the add operations in the multiple registers. Normally the cam 222 is positioned out of the path of a stud (Fig. 11) carried by the pawl 301 so that the indexed multiple register is normally in non-add position. But, when the sensing member 50 moves, it releases a latch that moves over bail 259 and the upward movement of said bail moves cam 222 laterally so that, when the machine is given a cycle of operation, the cam will actuate the pawl 301 to pull the link 300 downwardly at the end of the first half of the cycle of machine operation to cause an add operation. The pawl is released by the cam 222 at the end of the cycle of operation in the same manner as described for No. 1 main register.

Total taking on the indexed multiple register is controlled by a sensing member 49 (Fig. 2) which controls parts like those described for total taking in the No. 1 main register, said parts not being illustrated.

SIMULTANEOUS ADDITION IN MAIN REGISTER No. 1 AND SELECTED MULTIPLE REGISTER

It is sometimes desirable to add an item in both the main register and in a selected multiple register.

The No. 1 main register and its transfer mechanism are controlled in their operations by the cams 222 and 223 which are moved laterally to the right for this purpose. The selected multiple register and its transfer mechanism are also controlled in their operations by the cams 222 and 223 which are moved toward the left for this purpose. Obviously, the two cams cannot occupy right and left hand positions at the same time.

For simultaneous addition in the No. 1 main register and in a selected multiple register the cams 222 and 223 are moved to the left to the position for addition in a selected multiple register. Both of the sensing members 50 and 51 (Fig. 2) are allowed to pass through openings in the index disk but the controls are arranged so that the sensing members 50 for the multiple register predominates. The parts for accomplishing this predominance have not been illustrated in detail as an understanding of their operation does not seem necessary for an understanding of the operation under discussion.

In order to move the main register No. 1 into engagement with the actuator rack together with the selected multiple register, the link 300 which is moved to engage the selected multiple register has a pawl 310 pivoted to it (Fig. 11). This pawl is urged clockwise by a spring 311 so as to normally be out of the path of a stud 312 on the link 228 that controls main register No. 1. However, when the plate 242 for the main register is raised during the early part of the machine cycle, it rocks the lever 243 and the latter is connected by a link 313 to a lever 314 that has an arm 315 positioned behind a stud 316 on pawl 310. The result is that, when the plate 242 is raised the pawl 310 is rocked counterclockwise against the tension of its spring 311 to a position such that, when link 300 is moved downward to engage the selected multiple register with the racks, the pawl 310 engages stud 312 and moves link 228 down to engage main register No. 1 with the racks.

The item is thus simultaneously added in the selected multiple register and in main register No. 1.

The above action does not occur when the plate 242 is raised to add in the main register alone because, in such an operation, the cams 222 and 223 are to the right and only the link 228 moves. In operations in a selected multiple register while the main register No. 1 is not being operated, that is, when there is an aperture in plate 20 in alignment with sensing member 50 but no aperture aligned with sensing member 51, the pawl 310 is not rocked because plate 242 is not raised.

AUTOMATIC CONTROL OF SUBTRACTION

The program disk 20 also controls subtraction automatically but in a somewhat different manner than that in which the other functions are controlled. In order to understand the subtraction control it is necessary to briefly review the manner in which subtraction is performed in the Burroughs machine with which the invention has been illustrated.

When an item is to be subtracted it is entered on the keys and the machine is then conditioned for an "extend" operation by depression of an "extend" key. Referring to Fig. 11, the rack bars 7 that cooperate with the register pinions of the register from which the item is to be subtracted are coupled by pin and slot connections with arms 330 pivoted on the shaft 331. When the machine is given a cycle of operation these arms are released for clockwise movement during which the rack bars 7 move forward to differential positions. For add operations, the register is then engaged with the racks after which the arms 330 are restored to normal to enter the item additively in the register. Positioned adjacent each of the arms 330 is a secondary arm 332 (Fig. 11) having a notch in its upper end adapted to engage over a stud 333 on the arm 330. Each secondary arm is connected by a link 334 to a pendant 335 slidably mounted on a stop member 336 of which there is one for each order of the machine.

Normally, the secondary arms 332 occupy the position of Fig. 11 where the slots in their upper ends are below the studs 333. But, when the machine is conditioned for an "extend" operation, these secondary arms are moved upwardly so that the studs are in the slots. This occurs early enough in the machine cycle to latch the secondary arms 332 to the arms 330 before the latter move forward. The result is that, as the arms 330 with the actuator racks 7 move forward to differential positions, the secondary arms together with the pendants 335 are differentially positioned. Before the main arms 330 are restored to normal, the secondary arms 332 are released so that the pendants 335 remain in differential positions corresponding to the item that has been indexed. The item is thus "extended" into the pendants at the rear of the machine. The register is not engaged with the racks 7 during this cycle.

The machine is then given a second cycle of operation during which the subtraction plates 364 (Fig. 2) are raised. These plates are joined by crossbars (Fig. 17) which engage the pendants 335 to raise the stop members 336 to differential position. These stop members have shoulders 237 on them positioned to engage lugs 338 on the actuator racks. The arrangement of the shoulders is such that they serve as index stops for the racks to index each rack for the complement of the digit that was indexed on the keys relative to "9." Thus during the second cycle of machine operation, the actuator racks move forward to differential positions corresponding to the "9" complements of the digits in the respective orders of the amount which should be subtracted, and these "9" complements are added on the pinions in the corresponding orders of the register, provision being made for a reason to be mentioned later to enter an extra "1" on the units order pinion of the register. The net result is that the item entered on the keys is subtracted from the register by a process of complemental addition.

In the present machine, the index disk 20 automatically controls the conditioning of the machine for an "extend" operation and the two cycles of machine operation are automatic so that the operator need do nothing except enter the amount to be subtracted in the keys and then depress the motor bar.

When an item is to be subtracted, it is desirable to be able to subtract it from any one of the registers, that is, main register No. 1 or No. 2, or any one of the multiple registers. It will be recalled that the question of whether addition shall be performed on the respective registers is under the control of certain sensing members. If one of these sensing members were released upon depression of the motor bar, the corresponding register would be rocked into engagement with the actuator racks during the first machine cycle, but, in a subtract operation in the machine disclosed, this is not desirable because the first cycle is an "extend" operation during which the register should not engage the racks. Special provision is made for enabling the register to be selectively engaged with the racks at the desired time.

To provide for the extend operation the machine has an "extend" sensing member 46 (Figs. 2 and 13) which operates in the same way as the sensing members heretofore described. When the program disk 20 is provided with an opening for the nose of the sensing member 46, the member moves into it and releases a latch 340 (Fig. 13) similar to the latch 77 of Fig. 5 which is released by the sensing member 40. This latch 340 moves over the bail 259 so that, when the latter moves upwardly during the early part of the first machine cycle, it raises an "extend" plate 341. The upper edge of this plate engages a stud 342 (Fig. 11) on an arm 343 pivoted at 244. Connected to this arm is a downwardly extending link 345 having a laterally extending end positioned under a stud 346 on a plate 347 that is fixed to a rock shaft 348. This plate extends across the machine and has jaws that extend over projections 349 on the secondary arms 332 heretofore described.

With this construction, when the index plate 20 has an opening for the "extend" sensing member 46 the latter moves to position to release the latch 340, whereupon, during the initial part of the cycle of machine operation, the "extend" plate 341 is raised and the secondary levers 332 are raised to latch them to arms 330 to cause the item to be extended to the pendants 335 at the rear of the machine.

For the purpose of releasing the secondary arms 332 after they have moved forward to differential positions, the lower end of link 345 is provided with a stud 350 engaged by the bifurcated end of a slide 351 having a stud 352 on its forward end. The stud 352 is positioned in the path of an arm 353 that moves clockwise during the forward stroke of machine operation. At the extreme end of the forward stroke, the arm 353 engages the stud 352 and pushes the slide 350 rearwardly. This carries the lower end of the link 345 rearwardly to move its lateral extension from under the stud 346 on the plate 347. This plate, together with the secondary arms 332, then moves downward to the normal position of Fig. 11, leaving the pendants indexed for the following subtract operation.

As an incident to the "extend" operation the machine is conditioned for its second cycle. For this purpose the "extend" plate 341 is provided with a cam faced extension 355 (Fig. 17) which, when the "extend" plate is near the upper end of its movement engages a plate 356 fixed to a rock shaft 360 that is also slidable as will presently appear. Positioned behind this plate 356 is an extension 361 on a pawl 362 that controls a latch 363 on the subtract plate 364. The latch 363, when released, moves into the path of bail 259 heretofore described. When the latch 363 is released by the "extend" plate as above explained, the bail 259 is at the upper end of its movement. During the downward movement of the bail it passes the latch 363, but the bail engages said latch and raises the subtract plate at the beginning of the second cycle of machine operation.

Figure 17:
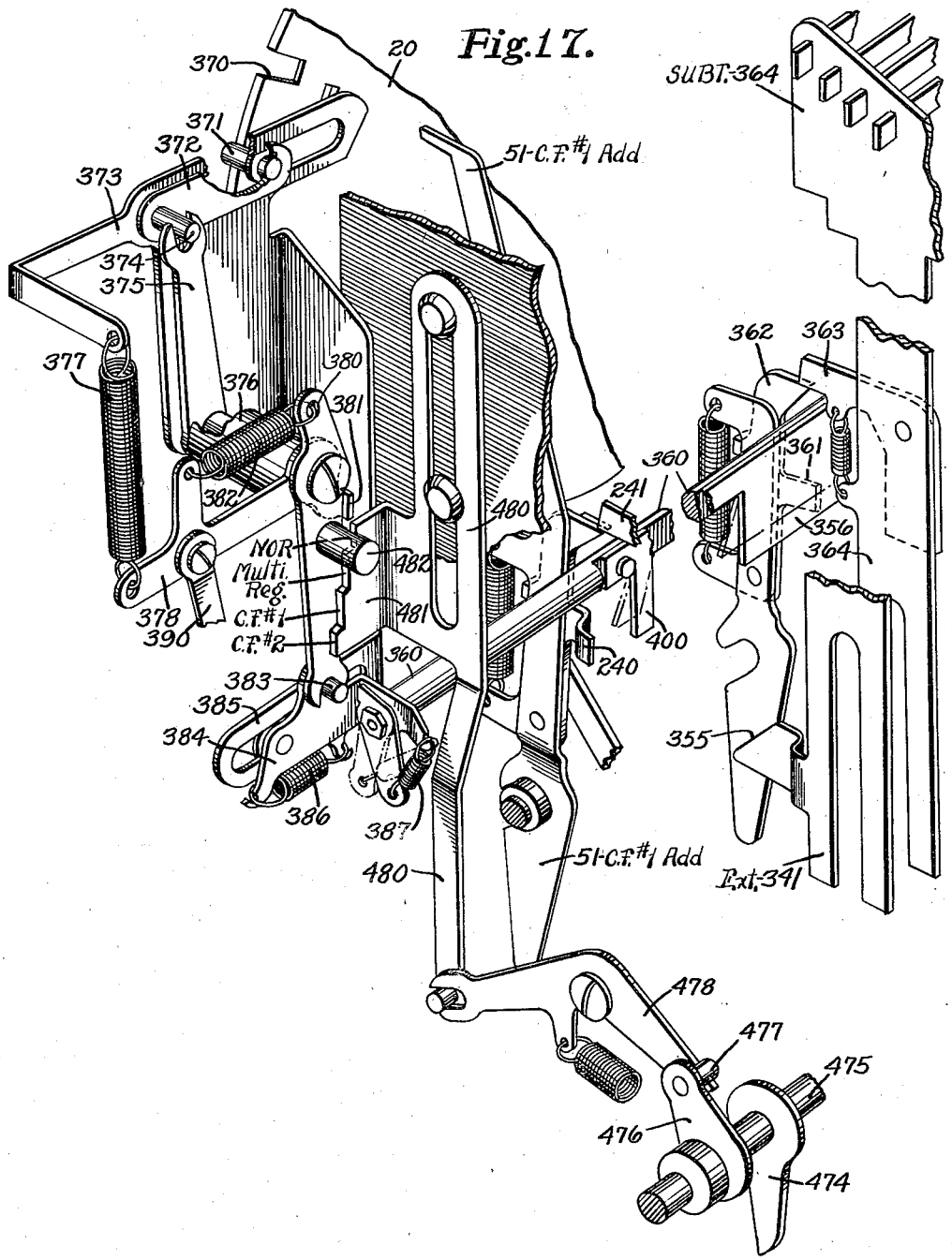
Fig. 17 is a partial perspective of the rear left corner of the machine showing the extend and subtract mechanisms.

To summarize briefly, the index disk 20 controls a sensing member 46 which causes an "extend" plate to be raised during the first machine cycle to cause an "extend" operation and this "extend" plate conditions parts that cause the "subtract" plate to be raised during the second cycle. The machine is thus properly conditioned to perform subtraction but it remains to select and control the register in which subtraction is to be performed. The desired register is selected and brought into operation at the appropriate time by a mechanism as follows:

Referring to Fig. 17, the index disk 20 is provided with notches 370 in its periphery, the number and the depth of the notches being varied to suit the requirements of the program. These notches are sensed by a stud 371 on a slide 372 mounted slidably in a stationary bracket 373. The slide 372 carries a stud 374 positioned in a slot in the end of an arm 375 fixed to a sleeve 376 pivoted to bracket 373. The sensing stud 371 and the slide 372 carrying it are urged to sensing position by a spring 377 attached to the stationary bracket 373 and to one end of an arm 378 whose other end is fixed to the sleeve 376.

Pivoted loosely on the arm 378 (Fig. 17) is a lever 380 urged counterclockwise against a lug 381 on arm 378 by a spring 382. The lever 380 is moved clockwise when arm 378 moves clockwise, but the lever 380 is free to move clockwise independently of arm 378, the movement being against the tension of spring 382. The lower end of lever 380 is bifurcated and positioned astride a stud 383 on a bracket 384 slidably mounted in a stationary frame plate 385. The bracket 384 is fixed to the end of shaft 360 which is slidably and rockably mounted on suitable bearings, not shown. The shaft 360 is urged to the right as viewed in Fig. 17 by a spring 386 and it is also urged counterclockwise as viewed in said figure by a spring 387.

Although the sensing stud 371 and the slide 372 are urged to sensing position, they are normally held against movement by a link 390 extending downwardly and connected at its lower end to an arm 391 (Fig. 15) fixed to the shaft 83. It will be recalled that upon depression of the motor bar, the shaft 83 is released to permit it to move to release the sensing members heretofore described. When this shaft is rocked, it releases link 390 and the spring 377 rocks the arm 378 clockwise to carry the slide 372 and the sensing stud 371 to sensing position. The stud will move into a notch in the disk if there is one present, the distance of movement depending upon the depth of the notch.

When the arm 378 is moved as just explained, it carries the arm 380 with it and the latter slides the bracket 384 and shaft 360 to the left, as viewed in Fig. 17, the distance of movement corresponding to the depth of the slot 375 in the index disk 20.

The shaft 360 carries a relatively narrow downwardly extending projection 400 (Fig. 17) which, in the normal position of the shaft, is inactive. However, when the shaft is slid longitudinally to the left, the projection can be moved in front of latches that respectively control addition in the multiple registers, main register No. 1, and main register No. 2. In order to avoid confusion, only one of these latches, to wit, the latch 240 for the main register No. 1, has been shown in Fig. 17. It is to be understood that similar latches are provided for the other registers.

Assume, for example, that the shaft 360 is moved to the left sufficiently to be in front of the latch 240 for the No. 1 main register. It will be recalled that, near the end of the upward movement of the "extend" plate 341, the cam face of the extension 355 engages the plate 356 and rocks the shaft 360 clockwise, the rocked position of the shaft being shown in dot-dash lines in Fig. 17. When the shaft is so rocked, its projection 400 releases the latch 240 which, in turn, releases latch 241, and the latter moves into the path of the bail 259 heretofore described. This release occurs during the forward stroke of the first cycle of machine operation, at which time the bail 259 is in its upper position. As the bail moves downward it passes the released latch, but, on the upward movement of the bail at the beginning of the second cycle of machine operation, the latch is engaged and the mechanism is moved for moving the selected register into engagement with the racks at the appropriate time to perform addition.

When the latch for either of the other registers is released, the respective register is moved into engagement with the racks at the appropriate time, instead of the No. 1 main register.

It will thus be seen that the index disk 20 is sensed in its various positions for a subtract operation. When so sensed, if the proper openings are present, the machine is conditioned for an "extend" operation and for a second cycle in which the complement of the extended item is added into a register. The registers may be automatically selected during the first or "extend" cycle, but the selected register is not rocked into engagement with the racks during said cycle. Whether the selected register or one of the main registers shall be the one in which subtraction is performed is determined by the program disk and depends upon the depth of the notch in the edge of the disk.

The second cycle of machine operation takes place automatically under the control of the following mechanism. As the "extend" plate 341 moves upward during the first cycle of machine operation, its upper edge engages a stud 410 (Figs. 13 and 15) carried by an arm 411 fixed to a shaft 412. The stud is raised until it engages a hook latch 413 which retains it and the shaft 412 in the moved position. Shaft 412 also has fixed to it a second arm 414 supporting a link 415 whose lower end is connected by a bellcrank 416 to a horizontally movable member 417 (Fig. 4). The latter has a stud 418 positioned to the rear of a slide 98$^a$ that is moved forward for raising the clutch trip member C. This slide 98$^a$ corresponds to the slide 29 in Hopkins Patent No. 1,025,698. The arrangement is such that, when the "extend" plate 341 moves to its upper position, the arm 411 and shaft 412 are rocked to raise link 415 and move slide 417 forward to move the stud 418 behind the slide 98$^a$ to prevent the latter from returning rearward when it is released. Since the parts are held in position by the hook latch 413 (Fig. 15) the slide 98$^a$ is held in its forward position at the end of the first cycle of machine operation, the clutch trip member C held upward, and the machine goes through a second cycle. The first cycle of operation is initiated by the motor bar of the machine that causes a cycle of operation but disables the tabulating mechanism as described in the Thieme Patent No. 1,259,929 heretofore mentioned. At the end of the first cycle this motor or starting bar is returned to normal, and the bail for restoring the sensing members also operates to restore them to normal. The tabulating mechanism is then in condition to operate for the next machine cycle; but, since this cycle is not initiated by depression of the motor bar, the sensing members 43–52 will not be released. Consequently there will be no conditioning of the machine under the control of the sensing members 43–52 during the second machine cycle. During the second cycle, a stud 420 (Fig. 15) on subtract plate 364, which is raised during the second cycle, engages a cam edge 421 on latch 413 and releases the latch to free stud 410, thereby permitting the parts to return to normal so that the machine will stop at the end of the second cycle.

Thus, when the paper carriage reaches a column where it is desired to subtract an item, said item may be entered on the keys and a motor bar depressed, after which the machine will automatically go through two cycles of operation and the item will be subtracted from the register that is selected in such predetermined column, the selection being controlled by the index disk 20 in one manner to select one of the multiple registers and in another manner, that is, by the slots in the edge of the disk, to determine whether the item shall be subtracted from the selected multiple register or from one of the main registers.

CONTROL OF "AUTOMATIC 1" MECHANISMS

As explained in the Hopkins Patent No. 1,206,133, the amount entered in the register by the racks 7 under control of the stepped plates 237 in the "subtraction" cycle is such that, if added to the amount which the operator entered on the keys, the sum would be "9" in every order of the register and it is necessary to add an extra "1" in the units order of the register in order to obtain the same correct result as though the subtraction had been performed directly. In other words, the complement added into the register by the racks 7 under control of the stepped plates 237 is the complement in respect of the base $10^n-1$, where $n$ is the number of orders in the register, whereas, in order correctly to perform subtraction by the method of adding the complement, the complement should be the complement of the subtrahend with respect to the base $10^n$ and it is, therefore, necessary to add another "1" in the units order of the register each time a complement with respect to the base $10^n-1$ is added in the register. This is accomplished automatically by a means which trips the transfer mechanism for the units order of the register during the "subtraction" cycle to enter an extra "1" in the units order of the register. For convenience, this extra "1" added in the units order will hereinafter be referred to as the "automatic 1." There is one such means for the No. 1 main register, another for the No. 2 main register and another for the multiple registers. Obviously, each of these three "automatic 1"

means should be operated only when the complement is entered in its respective register. Accordingly, means are provided for automatically selecting the respective "automatic 1" means for operation in accordance with the registers being operated in subtraction operations.

The present machine has an "add" plate for each register that is raised during each cycle of machine operation in which the corresponding register is operated. Each of the two "add" plates C. F. #1 and C. F. #2 is provided with a cam 430, one of which is shown in Fig. 11 and two of which appear in Fig. 2. The cam surfaces on the "add" plate for the two main registers are positioned to engage a stud 431, but the cam surfaces are slightly different, as will be clear from Fig. 2, so that each of the "add" plates, when raised, moves the stud a different distance. The stud 431 is carried by a link 432, one end of which is connected to a bell-crank 433 urged clockwise as viewed in Fig. 2 by a spring 434. The other end of this link is connected to one end of a pivoted lever 435. The upper end of lever 435 is positioned astride a stud 436 on a plate 437 slidably mounted on an extension 438 of a vertically movable slide 439. The slide plate 437 has an upwardly extending finger 440 normally positioned under a member 443 of the multiple register "automatic 1" mechanism but it may be positioned under the two other members 441 and 442. The left-hand member 441 (Fig. 2) controls the "automatic 1" mechanism for main register No. 2, the center member 442 controls for the "automatic 1" mechanism of main register No. 1, and the right-hand member 443 controls the "automatic 1" mechanism for the multiple registers.

The vertically movable slide 439 has a lateral extension at its lower end carrying a stud 444 positioned over one end of a pivoted pass-by pawl 445 whose other end has a lateral extension positioned in the path of a stud 446 on the subtract plate 364. When the subtract plate is moved upwardly the stud 446 passes the pass-by pawl 445 but, upon the return movement of the "subtract" plate, the stud engages the pass-by pawl and rocks it counterclockwise. This moves the slide 439 upwardly and causes the finger 440 on slide 437 to engage one of the members 441, 442, or 443 to trip the "automatic 1" mechanism for the register corresponding to said member. It will be understood that the registration of finger 440 with the respective members 441, 442, 443 depends upon which of the "add" plates is raised and the raising of the "add" plates depends upon which register is selected for operation, the selection being controlled by the sensing means including the stud 371, shaft 360 and associated parts previously described.

Thus, the "automatic 1" mechanisms are selectively operated in accordance with the register in which subtraction is performed, and since the registers are automatically selected by the sensing means, the "automatic 1" mechanisms can be said to be responsive to said sensing means.

SUBTRACTION IN ONE REGISTER WITH SIMULTANEOUS ADDITION IN ANOTHER

It is sometimes desirable to accumulate an item in a given register at the same time it is subtracted from another register. For example, it may be desired to subtract an item from main register No. 1 and, at the same time, add it into one of the multiple registers.

This may be done by providing the index disk 20 with a notch 370 of the depth necessary to cause subtraction to occur in main register No. 1 and by also having an opening 21 in said disk for the sensing member 50 which controls addition in the multiple registers. The selection of the particular register of the multiple group can also be controlled by an opening in disk 20 for the sensing member 41. Then, during the first cycle of the machine in the subtract operation, the item indexed in the actuator racks, which item is extended to the pendants, will be added in the indexed multiple register which is rocked into engagement with the actuator racks before they are restored to normal. This multiple register is not active during the second subtraction cycle because the sensing member 50 is restored to normal at the end of the first cycle.

AUTOMATIC CONTROL OF OTHER FUNCTIONS

As heretofore mentioned, sensing members are also provided for the automatic control of the printing mechanism, the bichrome ribbon, date printing, and a non-clear lock. Details of these controls have not been shown as an understanding of such details is not considered necessary for understanding of the present invention. The respective sensing members operate certain connections that control the respective functions in the same general manner as such functions have heretofore been controlled by carriage actuation.

KEY CONTROLLED DISABLEMENT OF AUTOMATIC CONTROL

Under certain conditions it is desirable to disable the automatic control, and key control has been provided for this purpose.

As already explained, and as shown in Fig. 1ª the machine is provided with the usual control keys, such as the total key "Bal.", sub-total key "Sub. bal.", etc. When the machine is conditioned for predetermined functions by depression of one of these keys, it is not desirable to have the machine automatically conditioned for a different function by the sensing means heretofore explained.

Referring to Fig. 1ª the total key "Bal.", when depressed, pulls a rod 450 forwardly. This rod is connected at its rear end to a slide similar to the slide 462 in Fig. 15. Said slide, like slide 462 has a lug engaging bail 464. Bail 464 is adapted to engage a lug 450ª on a lever that is pivoted at its middle to the machine base and connected at its other end by a link 450ᵇ (Fig. 3), to a bell crank yoke 451 (Fig. 3) having an arm extending under a stud 452 on the slide 94. When the total key is depressed, the slide 94 is moved upwardly so that its lug 96 is out of the path of the shoulder 96 on the slide 98 that is moved forwardly upon depression of the motor bar. The result is that, if the total key is depressed prior to the depression of the motor bar, the depression of the latter will not release the sensing members 43 to 52, inclusive, which will remain in normal or inactive position during the cycle of machine operation. These sensing members control what have been termed for convenience the calculating functions of the machine. It is to be observed that the sensing members 40 and 41 which control the carriage tabulation and the selection of multiple registers have not been disabled. Disablement of the automatic control is also accomplished by depression of other keys connected to yoke 451, as will presently appear.

DOMINATION OF AUTOMATIC CONTROL BY MANUAL CONTROL

It is also desirable to make it possible for the operator, at his option, to manually alter the functions performed by the machine, and the selection of the registers, irrespective of the automatic control, and at other times than when totals are taken. In other words, he should be able, in any position of the carriage, and irrespective of the automatic control, to get what operations he desires without interference from the automatic control. And this should be done in such a manner that the automatic control remains effective for succeeding operations after the manual control has been exercised. Provision is made for enabling the operator to add or subtract an item in any register at any time and to enable a total to be taken from any register at any time. These two general classifications of operations will be described separately.

(a) *Manual control of addition or subtraction in any register*

On the side of the keyboard (Figs. 1 and 1ª) is a manually movable lever 460 which normally occupies the position marked "NOR" in Fig. 1ª, but is movable forward to "subtract" (—) position, or rearward to addition position (+). When the lever is moved to either its add or subtract position, one of three keys is depressed for selecting the register in which the operation is to be performed, that is, if it is in main register No. 1, the key marked "CF No. 1" is depressed, if it is to be in main register No. 2, the key marked "CF No. 2" is depressed, and if it is to be in one of the multiple registers, the key marked "Front reg." is depressed. Any one of the multiple registers may be selected by moving the register magazine to the desired position, the mechanism for doing this being known and disclosed in the Müller patent heretofore referred to. After the lever 460 has been positioned and the proper register selection key depressed, the motor bar is depressed to give the machine a cycle of operation.

Depression of the motor bar ordinarily releases the sensing members of the automatic control, but when one of the three keys "CF 1," "CF 2," or "Front reg." is depressed, the automatic control is disabled. Referring to Fig. 1ª, the rods 461 of the respective keys are connected at their rear ends to slides 462, of which one is shown in Fig. 15. These slides have upstanding lugs 463 positioned behind a pivoted bail 464. This bail operates the bell crank yoke 451 in Fig. 3 through the link 450ᵇ and yoke 451 when rocked counterclockwise, raises the slide 94 and prevents release of the sensing members 43 to 52, inclusive. This disables the automatic control so that the manual control just described can take place. The sensing members 40 and 41 for carriage tabulation and multiple register selection remain active so as to be in condition for the next cycle of machine operation if they are needed.

In describing the mechanism controlled by lever 460 it will be assumed that an amount is to be subtracted from the main register No. 1 since the controls for this register and the subtraction controls are more clearly illustrated in the drawings than the addition controls or the subtraction controls for the other registers.

Referring to Fig. 16, the lever 460 is connected to a link 465 whose rear end is connected to a slide 466 (Fig. 15) that in turn, is connected to a second slide 467. About midway of the second slide 467 is a laterally extending stud 468 positioned under the edge of a lever 470 pivoted on another slide 471 and spring urged counter-clockwise. The forward end of lever 470 has an upstanding end adapted to be positioned in front of a square stud 472 on the slide 462 connected to the "CF 1" key.

The slide 467 with its stud 468 has three positions corresponding to the three positions of lever 460, that is, a center or "normal" position, a rear or "add" position, and a forward or "subtract" position. In Fig. 15 the parts are shown moved to "subtract" position where the stud 468 occupies a notch in the edge of lever 470 and the latter is free to move to the position shown where the upstanding end of the lever is in front of square stud 472. When the slide 467 is moved to its "normal" or its "add" position, the stud 468 moves to the dot-dash positions of Fig. 15 and rocks the lever 470 clockwise out of engagement with the square stud 472.

To describe the mechanism more generally, when the manual lever 460 is moved forward to "subtract" position, certain parts, hereinafter described, are hooked up to the slide 462 operated by depression of the main register key "CF 1" so that, when said key is depressed, these parts will be operated.

As previously mentioned, the lever 470 is pivoted to a slide 471. This slide extends rearwardly and its rear end carries a stud 473 positioned behind an arm 474 fixed to a shaft 475. This shaft has another arm 476 fixed to it that carries a stud 477 positioned over one end of a lever 478. The other end of this lever is connected to the lower end of a slide 480 illustrated more clearly in Fig. 17. The slide 480 has a lateral projection 481 provided with four shoulders, or steps, which are, respectively, the "normal" steps, the multiple register step, the main register No. 1 ("CF 1") step, and the main register No. 2 ("CF 2") step. When the slide 480 is moved upwardly these shoulders operate against a stud 482 on the arm 380 to rock said arm clockwise to slide shaft 360 a distance corresponding to the shoulder that is moved to position. In other words, movement of slide 480 by hand, moves the shaft 360 to selective positions to select the multiple registers or one of the main registers for operation.

As so far described, the movement of the manual lever 460 to "subtract" position and the depression of the "CF 1" key, would move slide 480 to only one position, namely, the position for rendering main register No. 1 active. However, as previously explained, there is a slide 462 for each of the keys "CF 2" and "Front reg.", the latter being the key controlling the multiple register. Each of these slides 462 has a square stud like the stud 472 (Fig. 15) and each stud cooperates with a separate lever 470 pivoted on a separate slide 471 cooperating with a separate arm 474 on shaft 475. The stud 468 on slide 467 controlled by manual lever 460 is long enough to control all three levers 470.

The result is that, when manual lever 460 is moved to "subtract" position, stud 468 frees all three levers 470 which then move in front of their studs 472. Then, upon depression of the "CF 1," the "CF 2" or the "Front reg." key the shaft 475 is rocked to raise the slide 480 (Fig. 17), the arrangement of the parts being such that depression of said keys rocks said shaft different distances to differentially position slide 480 in accordance with the key depressed.

This selection of registers will take place in spite of the automatic sensing control, and without disturbing it, owing to the fact that the arm 380 is loosely mounted and yieldingly connected by a spring 382 to the arm 378. The release of the sensing members of the automatic control having been prevented, as previously described, the automatic control does not operate.

The rocking of shaft 475 by depression of one of the keys "CF 1," "CF 2," or "Front reg." also conditions the machine for an "extend" operation. Referring to Fig. 13 the shaft 475, which is viewed from the opposite side in Fig. 15, moves clockwise when one of these keys is depressed. Fixed to the shaft is a lever 490 having a stud 491 engaged in a cam slot 492 in one end of a lever 493 fixed to a shaft 494. The latter shaft has another arm 495 fixed to it and provided with a stud 496 engaging in a notch in a link 497. The rear end of link 497 is connected to the dog 498 controlling the latch 340 that, when released, moves over the bail 259 to cause the "extend" plate to be raised when the bail is raised. The shape of the cam slot 492 is such that, no matter which of the three keys "CF 1," "CF 2," or "Front reg." is depressed, the arm 495 will be rocked sufficiently to cause the latch 340 for the "extend" plate to be released. Thus, when the lifting bail 259 is raised during the initial part of the cycle of machine operation, the "extend" plate will be raised and an "extend" operation performed during this machine cycle. As previously described, the "extend" plate 341 (Fig. 17) controls the release of the latch 362 for the "subtract" plate, it controls the motor control for a second cycle and it also rocks the shaft 360 to release the latch for the selected register so that said register will be rocked into engagement with the racks during the second machine cycle.

From all this it should be clear that, no matter what the automatic control may be, the machine may be conditioned to subtract in any of the registers by moving the manual control lever 460 to subtract position and then depressing the key corresponding to the register selected and the motor bar. During the first cycle of machine operation the item will be extended into the pendants at the rear of the machine, the machine will be conditioned for a second cycle, it will be conditioned to cause the "subtract" plate to be raised, and it will be conditioned to cause the proper register to be operated so that, during the second cycle of machine operation, the item will be automatically subtracted from the selected register.

When an amount is to be added in a selected register, the manual control lever 460 is moved rearward to its "add" position. This moves the slide 467 (Fig. 15) rearward and moves the stud 468 to its rearward dot-dash position. This moves all three levers 470 clockwise until their upstanding ends are out of engagement with the studs 472 with the result that the slides 462 moved by the keys "CF1," "CF 2," and "Front reg." are not hooked up to the levers 470 and the slides 471 that rock shaft 475.

However, immediately to the right, viewing the machine from the front, of each of the slides 471, which will be called the subtract slides, is a slide 500 (Fig. 15). There are three of these slides 500 corresponding to the three keys "CF 1," "CF 2" and "Front reg." and they will be called the "add" slides. Each of the slides 500 has a lever 501 pivoted to it, which lever has an upstanding front end adapted to be moved in front of the square stud 472. The levers 501 are controlled by the stud 468 on slide 467 controlled by the manual lever 460, but the edges of the levers 501 are shaped so that where the manual lever 460 is in its rear, or "add," position, the levers are hooked to stud 472, but when the lever 460 is in its "normal" or "subtract" positions, said levers 501 are free of stud 472.

The rear end of the add slide 500 for the main register No. 1 is provided with a downwardly extending end adapted to engage a stud 502 on one end of a lever 503 that is pivoted at 494. The other end of this lever has a stud 505 on it adapted to engage a notch in the edge of a link 506. This link is connected to the detent 240 that releases the latch 241 (Fig. 11) for the "add" plate for causing the amount to be added in the main register No. 1. It will be noted by reference to Fig. 11 that the detent 240 can be moved counterclockwise to release latch 241 without disturbing the position of the sensing member 51. In other words, the same means for causing the No. 1 register to add is controlled by the index disk 20 and by a manual control.

Each of the three "add" slides 500, Fig. 15, controls a separate lever 503 which is connected by a separate link 506, Fig. 11, to its detent 240 for the latch for the "add" plate for the register corresponding to the slide.

With this construction, the manual lever 460 can be moved to add position and either of the keys "CF 1," "CF 2," or "Front reg." depressed. The movement of the manual lever hooks up the "add" slides to the three keys mentioned and the depression of one of these keys determines which register shall engage the racks.

When the manual lever 460 is moved to either its "add" or "subtract" position, a latch, portions of which are shown at 508, Fig. 1, is used to hold the lever in the position to which it is moved.

When either of the three keys "CF1," "CF 2," or "Front reg." is depressed, they are latched in depressed condition by a bail 510 (Fig. 15) which engages upstanding lugs 511 on the slides 462. At the extreme end of the machine operation the bail 510 is rocked counterclockwise by a member 512 to release the depressed key. These three keys are released at the end of the first machine cycle during a subtract operation in which the machine is given two cycles. However, the key depressed remains depressed long enough during the first machine operation to enable the machine to properly operate.

There is also an interlocking bail 513 for preventing a key from being depressed during cycles of machine operation, said bail being similar to those employed on the standard Burroughs-Hopkins machines.

(b) *Taking a total from any desired register*

A total can be taken from any of the registers at the option of the operator in any columnar position of the carriage irrespective of the automatic control of the machine functions in said column.

For this purpose, use is made of a hand lever 520 shown in Figs. 1ᵃ and 16 which is moved to one of the three positions marked "Front reg." "CF 1," or "CF 2." These three positions are respectively for the multiple registers, main register No. 1, and the main register No. 2. A total is taken from any register by moving the lever 520 to the desired one of the above three positions and by then depressing the balance key "Bal." and the motor bar. In describing the mechanism, it will be described with the lever 520 moved to the "CF 1" position, that is, a position for taking a total from main register No. 1.

A total is ordinarily taken on the Burroughs-Hopkins machine with which the invention has been illustrated, by depressing the total key, "Bal.", which releases a latch for a total-taking plate so that this latch moves over the bail 259 that is raised during each cycle of machine operation. The raising of the "Total" plate causes the register to engage the racks before they are moved to differential positions and to then be disengaged from said racks after the register has been cleared.

The balance key "Bal." (Fig. 1a) is connected by the rod 450 to a slide 521 (Fig. 12). There are three of these slides, that is two additional slides similar to the slide 521, one being for the sub-balance key "Sub. bal.," and the other for the credit balance key, "Cr. bal.". Only one slide will be described in detail, it being understood that the slides for the two other keys operate in the same way.

The rear end of slide 521 has a hooked end engaging behind a square stud 522. The slides 521 for the other two keys hook over stud 522 also so that whenever one of these keys is depressed the stud 522 is pulled forward.

The manual lever 520 is connected by link 520a, Fig. 16, to a slide 523 (Fig. 12) carrying a stud 524 engaging under the cam edge of a lever 525 that is spring-urged counterclockwise and provided with a hooked end adapted to engage the square stud 522. When the manual lever 520 is in its central, or "CF 1," position the stud 524 occupies the position shown in Fig. 12 in which the lever 525 is hooked onto the stud 522. If the manual lever 520 is moved either forward or backward, the slide 523 and stud 524 are moved accordingly, which causes lever 525 to disengage it from stud 522.

Under these conditions, when the balance key, "Bal.," is depressed and the link 521 is moved forward, the stud 522 moves forward, and the lever 525 is also pulled forward. In other words, when the lever 520 is in the "CF 1" position, the lever 525 is hooked to the balance key "Bal." so that when the balance key is depressed, the parts controlled by the lever 525 will be moved.

Lever 525, Fig. 12, is pivoted on a slide 526 whose rear end is positioned behind a stud 527 on a lever 528 pivoted at 494. The upper end of this lever carries a stud 530 operating in a notch in a link 531 urged clockwise by a spring 532. The rear end of this link is connected to a detent 533 that controls the latch 260 for the total-taking plate 261 for the main register No. 1.

With this arrangement, when the manual lever 520 is moved to "CF 1" position and the balance key "Bal." depressed, the link 526 is moved forward, which rocks lever 528 counterclockwise, pushes link 531 to the rear and releases latch 260, which moves over the bail 259. As the machine starts to operate, bail 259 is lifted and it raises the total-taking plate for main register No. 1 to cause the machine to take a total from said register. The depression of the "Bal." key disables the sensing controls for calculating functions, as previously described.

In order that the forward movement of the stud 522 may release the proper total plate for the multiple register, and main register No. 2, as well as main register No. 1, there are two additional levers 540 and 541 (Fig. 12) similar to the lever 525. It will be observed that the cam surfaces on their lower rear edges of levers 540 and 541 are shaped differently than the cam surfaces on the lever 525. These cam surfaces are so arranged that only one of the three levers 525, 540, 541 can be hooked in front of the stud 522 at a time. When the manual lever 520 is moved to its "CF 2" position, the stud 524 is pulled forward, which causes the lever 540 to be hooked onto stud 522. When the manual lever 520 is pushed rearward to the "Front reg." position, the stud 524 is moved rearward to cause lever 541 to be hooked onto stud 522. Upon depression of either the balance key, "Bal." or sub-balance key, "Sub. bal.," or the credit-balance key "Cr. bal.," one of the levers 525, 540 or 541 will be pulled forward, depending upon the position of manual lever 520.

The two additional levers 540 and 541 are connected to levers similar to the lever 528 so that the appropriate total plate latch is released in accordance with the register that has been selected by the manual lever 520. All these parts have not been illustrated because they are duplicates of the parts shown for the "CF 1" position.

To summarize briefly, when the manual lever 520 is moved to one of its three positions, the appropriate connections at the rear of the machine corresponding to the position of the lever are hooked to the stud 522 so that upon depression of either the balance, the sub-balance, or the credit-balance key, connections will be conditioned so that, upon operation of the machine, the appropriate total, sub-total, or credit balance function will be performed in the selected register.

It is to be understood that the mechanism just described is employed only when the operator desires to take a total from a selected register at his option and without regard as to how the automatic sensing control may be conditioned. The automatic control will operate as heretofore described to automatically condition the machine to take a total from any selected register but, if the operator should happen to want to take a total at some time other than that designated in the automatic program, he can do so by means of the mechanism just described.

CREDIT BALANCE OR NEGATIVE TOTAL

When a credit balance or negative total occurs in one of these registers, a signal in the form of a red flag 600 shown in Fig. 1 appears in one of three openings to indicate to the operator that a negative total exists in the register corresponding to the opening. The operator moves the manual control lever 520 to a position corresponding to the register in which the negative total exists, that is, if the negative total is in the main register No. 1, the manual lever is moved to the "CF 1" position, the credit balance key, "Cr. bal.", shown in Fig. 1a is then depressed. This normalizes the automatic function control and causes the machine to take three complete cycles of operation by a mechanism, not shown.

During the first cycle, the negative total, which is really the complement of the true negative total, is extended to pendants at the rear of the machine as in a subtract operation. During the second cycle, the complement of this complement is added into a clear register. During the third cycle, the total is then taken from this register as a positive total, the total being, in fact, the true negative or algebraic total. A "automatic 1" is entered at the appropriate time by the mechanism heretofore described.

I claim:

1. In a machine of the class described operable to perform selected ones of a multiplicity of different functions, printing means, means for supporting record material in said machine, columnar-printing control means for determining the column in which said printing means shall print on said record material, an indexing means indexed automatically in accordance with the column in which printing occurs, a plurality of sensing devices normally held out of sensing engagement with said indexing means but released for movement into sensing engagement while said indexing means is in a given position, and means preventing said sensing devices from moving to sensing position while said indexing means is in said given position, said preventing means being automatically disabled after said indexing means has moved away from said given position.

2. In a machine of the class described operable to perform different functions, printing means for supporting record material in said machine, columnar-printing control means for determining the column in which said printing means shall print on said record material, indexing means in the form of a movable perforated member, means indexing said perforated member automatically in accordance with the column in which printing occurs, a sensing member released automatically to move through the perforation in said member in a given position of said indexing member, and a shield normally preventing said sensing member from moving through said perforations while said indexing member is in said given position, said shield being automatically moved to release said sensing member after said indexing member has moved away from said given position.

3. In a machine of the class described operable to perform different functions, printing means, means for giving the machine cycles of operation, means for holding record material in said machine, columnar-printing control means for determining the column in which said printing means shall print on said record material, an indexing means indexed automatically in accordance with the column in which printing occurs, said indexing means being normally moved to a new position during the latter part of a cycle of machine operation, sensing means for controlling said columnar-printing control means released automatically for movement into engagement with said indexing means, means for preventing said sensing means from moving to sensing position while said indexing means is in the position it occupies at the time said sensing means is released, and means operating automatically to release said preventing means after said indexing means has moved away from said given position to thereby free said sensing means to enable it to sense said indexing means to determine the next column in which printing shall occur.

4. In a machine of the class described operable to perform different functions, printing means, means for supporting record material in said machine, columnar-printing control means for determining the column in which said printing means shall print on said record material, indexing means in the form of a movable perforated member indexed automatically in accordance with the column in which printing occurs, sensing means having portions operable to move through the perforations in said index member, a shield for preventing said sensing member from moving through the openings in said member, and means operable by the movement of said index member from one index position to another for moving said shield to free said sensing means to enable it to move to sensing position.

5. In a machine of the class described operable to perform different functions, a traveling paper carriage movable across the machine, tabulating mechanism controlling movements of said carriage to successive columnar positions across the machine, an indexing means indexed by said carriage, sensing means released to sense said indexing means to thereby control the tabulating mechanism of said carriage for each of its tabulating movements, means for preventing said sensing means from moving to final sensing position when it is released, and means operated by the movement of said indexing means from one position to another to free said sensing means to enable the same to move to its final position to thereby determine the next columnar position of said carriage.

6. In a machine of the class described adapted to perform different functions and to be given cycles of operation, printing means, means for supporting record material in said machine, columnar-printing control means for determining the column in which said printing means shall print on said record material, said columnar printing control means normally operating during the latter part of each cycle of machine operation, an indexing means indexed automatically in accordance with the column in which the printing occurs, sensing means operating to automatically sense said indexing means during each cycle of machine operation, and means by which said sensing means controls said columnar-printing control means to enable each column in which printing occurs to be determined by said indexing means.

7. In a machine of the class described adapted to perform different functions and to be given cycles of operation, printing means, means for supporting record material in said machine, columnar-printing control means for determining the column in which said printing means shall print record material on said, an indexing means indexed automatically in accordance with the column in which printing occurs, said indexing means moving from one position to another during a cycle of machine operation, and sensing means operable to sense said indexing means as it moves from one position to another to thereby automatically control the next column in which printing shall occur.

8. In a machine of the class described adapted to perform different functions and to be given cycles of operation, a traveling paper carriage normally moving from column to column across the machine as an incident to each cycle of machine operation, an indexing means indexed by said carriage, said indexing means moving from one position toward another as said carriage moves, and sensing means operable to sense said indexing means as it moves from one position toward another to thereby determine the columnar position of said carriage and the position of said indexing means.

9. In a machine of the class described adapted to perform different functions, a traveling paper carriage movable from column to column across the machine, an indexing means indexed by said carriage, said indexing means including a perforated member movable with said carriage, sensing means for sensing said perforated member, said sensing means including a sensing member movable through the perforations in said perforated member, means causing said sensing member to sense said perforated member as the latter moves with said carriage, and means controlled by said sensing member for arresting said carriage when a perforation in said perforated member moves into register with said sensing member.

10. A calculating machine of the class described having means for giving its cycles of operation, a traveling paper carriage, mechanism controlling the movement of said carriage, indexing means movable under control of said carriage to predetermined index positions corresponding to the positions of said carriage, and sensing means operable to sense said indexing means automatically during each cycle of machine operation to thereby selectively control said carriage controlling mechanism to determine the next position to which the carriage shall be moved at the end of said machine cycle, whereby said carriage may be positioned at the end of each machine cycle in a subsequent columnar position selected by the indexing of said index means.

11. A calculating machine of the class described having means for giving it cycles of operation, printing means, means for holding record material on said machine, columnar-printing control means for determining the column in which said printing means shall print on said record material, indexing means movable under control of said columnar-printing control means to predetermined index positions in accordance with the column in which printing occurs, and sensing means operable automatically to sense said indexing means during each cycle of machine operation to thereby selectively control said columnar-printing control means to determine the next column in which printing shall occur whereby said columnar-printing control means automatically controls itself in the sequence of the columns in which printing shall occur.

12. A calculating machine of the class described having means for giving it cycles of operation, a traveling paper carriage, mechanism controlling the movement of said carriage, indexing means movable under control of said carriage to predetermined index positions in accordance with the position of said carriage, and sensing means operable to sense said indexing means automatically during each cycle of machine operation to thereby selectively control said carriage controlling mechanism to determine the next position to which the carriage shall be moved at the end of said machine cycle, whereby said carriage automatically controls its own movements from each position to predetermined succeeding positions.

13. In a calculating machine of the class described operable to perform selected ones of a multiplicity of different functions, a movable device normally moved during each operation of said machine, a freely and easily movable function indexing means automatically indexed under the control of said movable device, said indexing means including a member having a multiplicity of perforations therein, said member being operable in each of its positions to index said machine for any one or more of said multiplicity of functions, a multiplicity of function control devices for said machine, a multiplicity of sensing devices governing said control devices and normally held out of sensing position relative to said perforated member but movable to sense the indexed perforations in said member to thereby condition said function control devices for a machine function program determined by said perforated member, and means for returning said sensing devices to normal position prior to the movement of said perforated member to its next indexed position.

14. In a calculating machine of the class described operable to perform selected ones of a multiplicity of different functions, a movable device normally moved during each operation of said machine, a freely and easily movable function indexing means indexed automatically by said movable device, said indexing means including a movable member having a multiplicity of perforations therein, a multiplicity of function control devices for said machine, a multiplicity of sensing devices governing said control devices, means for moving said sensing devices from a position out of engagement with said perforated member to sensing position and causing portions of said devices to move through the indexed perforations in said member to condition said function control devices for machine functions predetermined by said perforated member, and means for restoring said sensing devices to normal after they have sensed said perforated member.

15. In a calculating machine of the class described adapted to be given cycles of operation and operable to perform selected ones of a multiplicity of different functions, a traveling paper carriage normally movable to a different columnar position during the latter half of each machine cycle, a freely and easily movable function indexing means automatically moved to index positions by said carriage, said indexing means including a member having a multiplicity of perforations in it, a multiplicity of function control devices for said machine, a multiplicity of sensing devices governing said control devices, means for moving said sensing devices from a position out of sensing engagement with said perforated member to sensing position and to cause said sensing devices to sense said perforated member to thereby automatically condition the function control devices for machine functions determined by the position of said carriage at the time the machine is cycled, and means for moving said sensing devices out of sensing position prior to movement of said carriage caused by said machine cycle.

16. In a calculating machine of the class described operable to perform selected ones of a multiplicity of different functions and to be given cycles of operation, a traveling paper carriage normally movable from one column to another as an incident to each machine cycle, indexing means indexed by said carriage, said indexing means including a freely and easily rotatable disk having sets of perforations located along different radii, a multiplicity of function control devices for said machine, a multiplicity of sensing members, means for moving said sensing members from a position out of sensing engagement with said disk to sensing position relative thereto to cause said sensing members to sense the indexed perforations in said disk to thereby automatically condition said function control devices for machine functions predetermined for a machine cycle by said disk, and means for moving said sensing members out of sensing position prior to movement of said carriage and said disk caused by said machine cycle.

17. In a calculating machine of the class described operable to perform selected ones of a multiplicity of different functions, a traveling paper carriage, freely movable function indexing means indexed by said carriage, a multiplicity of function control devices for said machine, a multiplicity of sensing devices governing said control devices and operable to sense said indexing means, means normally restraining said sensing devices in an inactive position, means for releasing said sensing devices to enable them to sense said indexing means while the latter is in a predetermined position, means preventing said released sensing devices from moving to final sensing position, and means controlled by said indexing means in its movement from said indexed position to another position to free said sensing devices to enable them to move to their final sensing position.

18. In a calculating machine of the class described operable to perform selected ones of a plurality of calculating functions, a traveling paper carriage movable from column to column across said machine, means for governing the movements of said carriage, a plurality of function control devices for selectively controlling said different calculating functions, means governing the movement of said carriage, a freely movable indexing means indexed by said carriage, and a plurality of sensing devices operable to sense said indexing means during each cycle of machine operation some of said sensing devices governing said function control devices to thereby condition said machine to perform predetermined calculating functions during said cycle in accordance with the columnar position of said carriage, and another of said sensing devices controlling the means governing said carriage to select the position in which the carriage will be arrested in its movement caused by said machine cycle.

19. In a calculating machine of the class described operable to perform selected ones of a plurality of different functions, means for giving said machine cycles of operation, a movable device normally moved during each machine cycle, a freely movable function indexing means indexed under the control of said movable device, a plurality of function control devices, a plurality of sensing devices governing said control devices and operable to sense said indexing means to selectively condition said function control devices for a machine function program predetermined by said indexing means, a manipulative device for conditioning a predetermined mechanism of said machine to enable said machine, when operated, to perform a predetermined function, and means controlled by said manipulative device for disabling said multiplicity of sensing devices whereby the manipulative control supersedes the sensing devices during a cycle of machine operation.

20. In a calculating machine of the class described operable to perform selected ones of a plurality of different calculating functions, a movable paper support, function indexing means indexed by said movable paper support, a plurality of function control devices for controlling the calculating functions of said machine and movement of said paper support, a plurality of sensing devices governing said control devices and operable automatically to sense said indexing means, and manipulative means operable to condition portions of said machine to enable it, when operated, to perform a predetermined function, said manipulative means also operating to disable those of said sensing devices controlling said calculating functions while allowing the sensing device that controls movement of said paper support to remain active.

21. In a calculating machine of the class described operable to perform selected ones of a plurality of different calculating functions, a movable paper support, a plurality of selectable multiple registers, function indexing means indexed by said movable paper support, means operable to select different ones of said multiple registers for operation, a sensing device operable to sense a portion of said indexing means and govern said register selecting means, function control devices for controlling calculating functions to be performed on the selected multiple register, sensing devices governing said control devices and operable to sense other portions of said indexing means, and manipulative means operable to condition portions of said machine to enable it, when operated, to perform a predetermined calculating function on the selected multiple register, said manipulative means being operable also to disable those of said sensing devices governing function controlling devices for calculating functions while leaving active the sensing device that governs the means for selection of multiple registers.

22. In a calculating machine of the class described operable to perform selected ones of a plurality of different functions, motor driving means, control means for causing said driving means to give said machine cycles of operation, a movable device normally moved during each machine cycle, a freely movable function indexing means indexed under the control of said movable device, a plurality of function control devices for said machine, and a plurality of sensing devices governing said function control devices and operable under control of said control means when the latter is conditioned to cause said motor driving means to give said machine a cycle of operation, to sense said indexing means after the latter has been indexed to thereby condition said function control devices for a machine function program predetermined by said indexing means.

23. In a calculating machine of the class described operable to perform selected ones of a plurality of different functions and adapted to be given cycles of operation, a traveling paper carriage, mechanism controlling the movements of said carriage, a freely movable program-indexing means indexed by said carriage, a plurality of function control devices for controlling the calculating functions of said machine and said carriage controlling mechanism, a plurality of sensing devices governing said function control devices and operable to sense said program-indexing means for each machine cycle to control said function control devices for a program of machine functions and carriage movements determined by said indexing means, said program-indexing means being readily detachable as a unit whereby one program-indexing means may be easily removed and another substituted to change the program of machine functions and carriage movements.

24. In a calculating machine adapted to perform a plurality of functions, a traveling carriage, function indexing means moved by said carriage proportionately to the movements of the latter to index positions corresponding to columnar positions of said carriage, a plurality of sensing devices operable to sense said indexing means, a plurality of function control devices adapted to condition predetermined mechanisms of said machine for given functions under control of said sensing devices, power driven means for cycling the machine, a starting bar, and means under control of said bar to initiate operation of said sensing devices and said power driven means.

25. In a calculating machine of the class described operable to perform selected ones of a plurality of functions, motor driving means, control means for causing said driving means to give said machine cycles of operation, a paper carriage normally moved from one to another of a plurality of columnar positions during each machine cycle, function indexing means indexed by said paper carriage synchronously therewith, a plurality of function control devices, a plurality of sensing devices governing said function control devices, means operable under control of said control means, when the latter is conditioned to cause said motor drive means to give said machine a cycle of operation, to cause said sensing devices to sense said indexing means after the latter has been indexed and to condition said function control devices, and means operated by a portion of the machine during the cycle of operation to separate said sensing devices and indexing means prior to movement of said carriage.

26. In a machine of the class described, means for giving said machine cycles of operation, a movable device normally moving during each machine cycle, indexing means moved with said movable device, a plurality of sensing devices, a plurality of function control means governed by said sensing devices, and means for operating different ones of said sensing devices at different times relative to a cycle of machine operation to sense said indexing means and condition the corresponding function control means at said different times.

27. In a machine of the class described, means for giving the machine cycles of operation, a traveling paper carriage normally moving from one columnar position to another during a cycle of machine operation, indexing means moved with said paper carriage, a plurality of sensing devices, a plurality of function control means governed by said sensing devices, and means for operating different ones of said sensing devices at different positions of said paper carriage during a cycle of machine operation.

28. In a calculating machine of the class described, drive means, manipulative means for causing said drive means to give the machine cycles of operation, a movable device, an indexing means moved with said device, a plurality of sensing devices, a plurality of function control means governed by said sensing devices, means operated by said manipulative means for causing operation of some of said sensing means, and means operated during the cycle of machine operation initiated by said manipulative means for causing operation of others of said sensing devices.

29. In a machine of the class described, means for giving the machine cycles of operation, a traveling paper carriage normally moving from one columnar position to another during the cycle of machine operation, indexing means moved with said paper carriage, a plurality of sensing devices, a plurality of function control means governed by said sensing devices, means for operating some of said sensing devices while said carriage is stationary, and means for operating others of said sensing devices while said carriage is moving.

30. A calculating machine of the class described having means for giving it cycles of operation, a plurality of function control devices operable at different times relative to a cycle of machine operation, a movable device, an indexing means movable proportionately with said movable devices from one to another of a plurality of indexing positions, said indexing means having a plurality of function indexing configurations, a plurality of sensing devices operable for sensing predetermined function indexing configurations of said indexing means for predetermined cycles of machine operation and accordingly conditioning the corresponding function control means, and means for operating different ones of said sensing devices at different times relative to the cycle of machine operation to sense the corresponding function indexing configurations and accordingly conditioning corresponding function control means at the appropriate different times relative to said cycle of machine operation.

31. A calculating machine of the class described having means for giving it cycles of operation, a plurality of function control devices, a movable device, an indexing means moved synchronously with said movable device from one to another of a plurality of indexing positions, said indexing means having a plurality of function indexing configurations, a plurality of sensing devices out of the range of said indexing means at all times while the latter is moving and operable for sensing predetermined function indexing configurations of said indexing means and accordingly conditioning the corresponding function control means, and means operable under control of said cycling means while said indexing means is stationary for causing said sensing devices to sense the function indexing configurations in indexed position.

32. A calculating machine of the class described having means for giving it cycles of operation, a paper carriage movable to a plurality of columnar positions, a plurality of function control devices, an indexing means movable by said paper carriage proportionately to the movements of the latter to corresponding indexing positions, a plurality of sensing devices out of the range of movement of said indexing means at all times while the latter is moving and operable for sensing predetermined portions of said indexing means and conditioning the corresponding function control means, and means for causing engagement between said sensing devices and said indexing means while the latter is stationary in an indexing position to cause said sensing devices to sense portions of said indexing means and accordingly condition the corresponding function control means.

33. A calculating machine of the class described having means for giving it cycles of operation, a plurality of function control devices, a unitary indexing means, means for normally moving said indexing means in each cycle of machine operation from one to another of a plurality of indexing positions, said indexing means having a plurality of function indexing configurations, a plurality of sensing devices normally out of the range of movement of said indexing means and operable for sensing predetermined function indexing configurations of said indexing means and conditioning the corresponding function control means, means for moving said sensing devices into cooperative relation to said indexing means to sense the function indexing configurations and accordingly condition the corresponding function control means, and means for retracting said sensing devices prior to movement of said indexing means to another indexing position.

34. A calculating machine of the class described having means for giving it cycles of operation, a paper carriage movable from one to another of a plurality of columnar positions, a plurality of function control devices, an indexing means movable by said carriage proportionately to the movements of the latter to corresponding indexing positions, a plurality of sensing devices normally out of the range of movement of said indexing means and operable for sensing said indexing means and accordingly conditioning the corresponding function control means, means including spring means urging said sensing devices toward engagement with said indexing means, controlled by said cycling means to cause said sensing means to sense said indexing means and accordingly condition the corresponding function control means, and means for holding said sensing devices out of engagement with said indexing means during movement of the said indexing means.

35. A calculating machine of the class described operable to perform selected ones of a multiplicity of different functions and to be given cycles of operation, a movable device normally moved during each machine cycle, function indexing means freely and easily movable by said movable device proportionately to the movements of said movable device, a plurality of function control devices for said machine, a plurality of sensing devices governing said control devices, said sensing devices being normally out of the path of said indexing means and operable to engage said indexing means, means operable after said indexing means has been indexed to cause an engagement between said sensing devices and said indexing means to thereby condition said function control means for a program of machine functions determined by said indexing means, and means operating to restore said sensing devices and indexing means to disengaged condition prior to movement of said indexing means to a new indexed position.

ROBERT L. MULLER.